Nov. 1, 1949   T. O. MEHAN   2,486,959
CALCULATING MACHINE
Original Filed Jan. 15, 1940   18 Sheets-Sheet 2

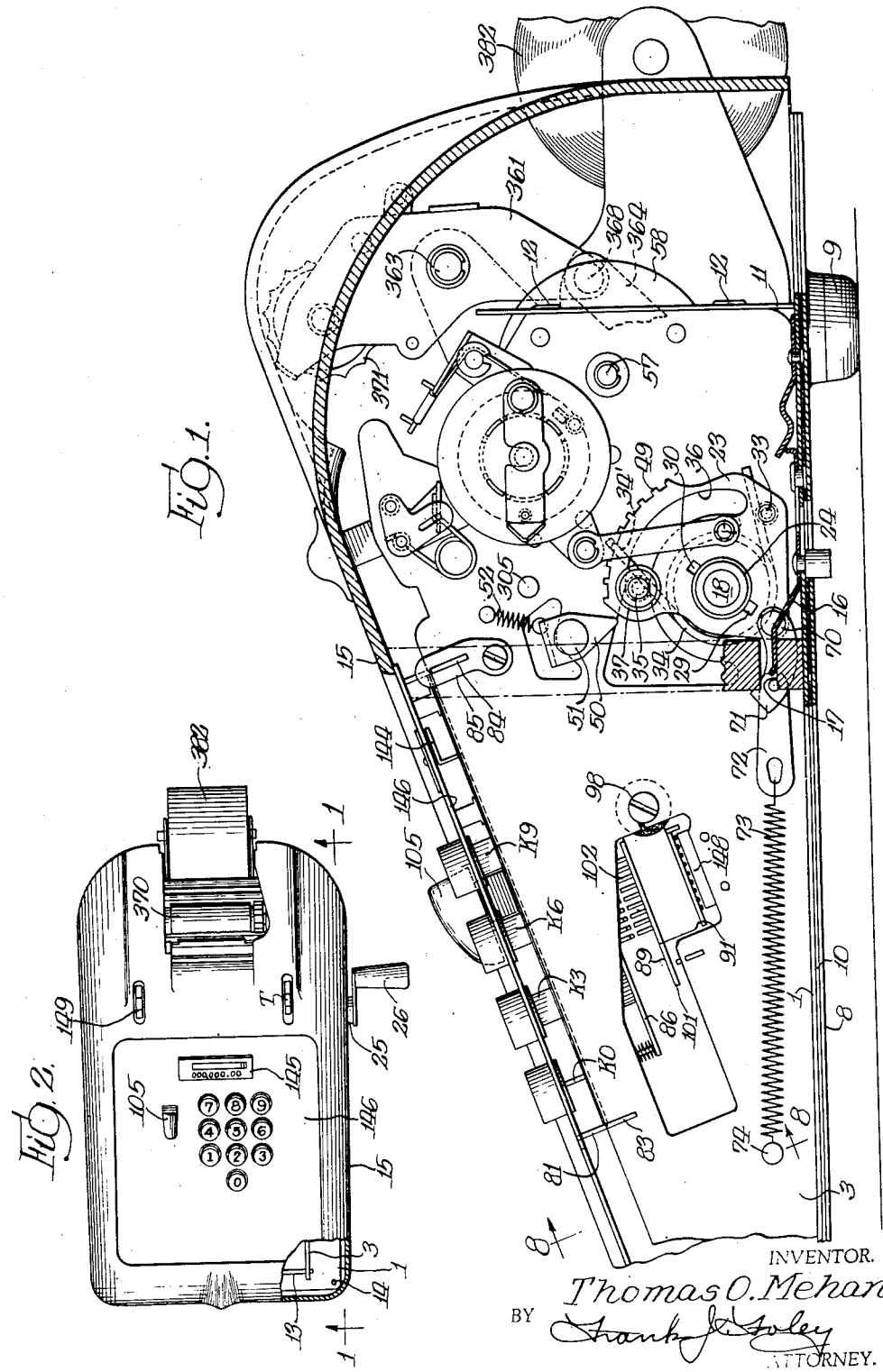

INVENTOR.
Thomas O. Mehan,
By Frank J. Foley
ATTORNEY.

Nov. 1, 1949     T. O. MEHAN     2,486,959
CALCULATING MACHINE
Original Filed Jan. 15, 1940     18 Sheets-Sheet 3
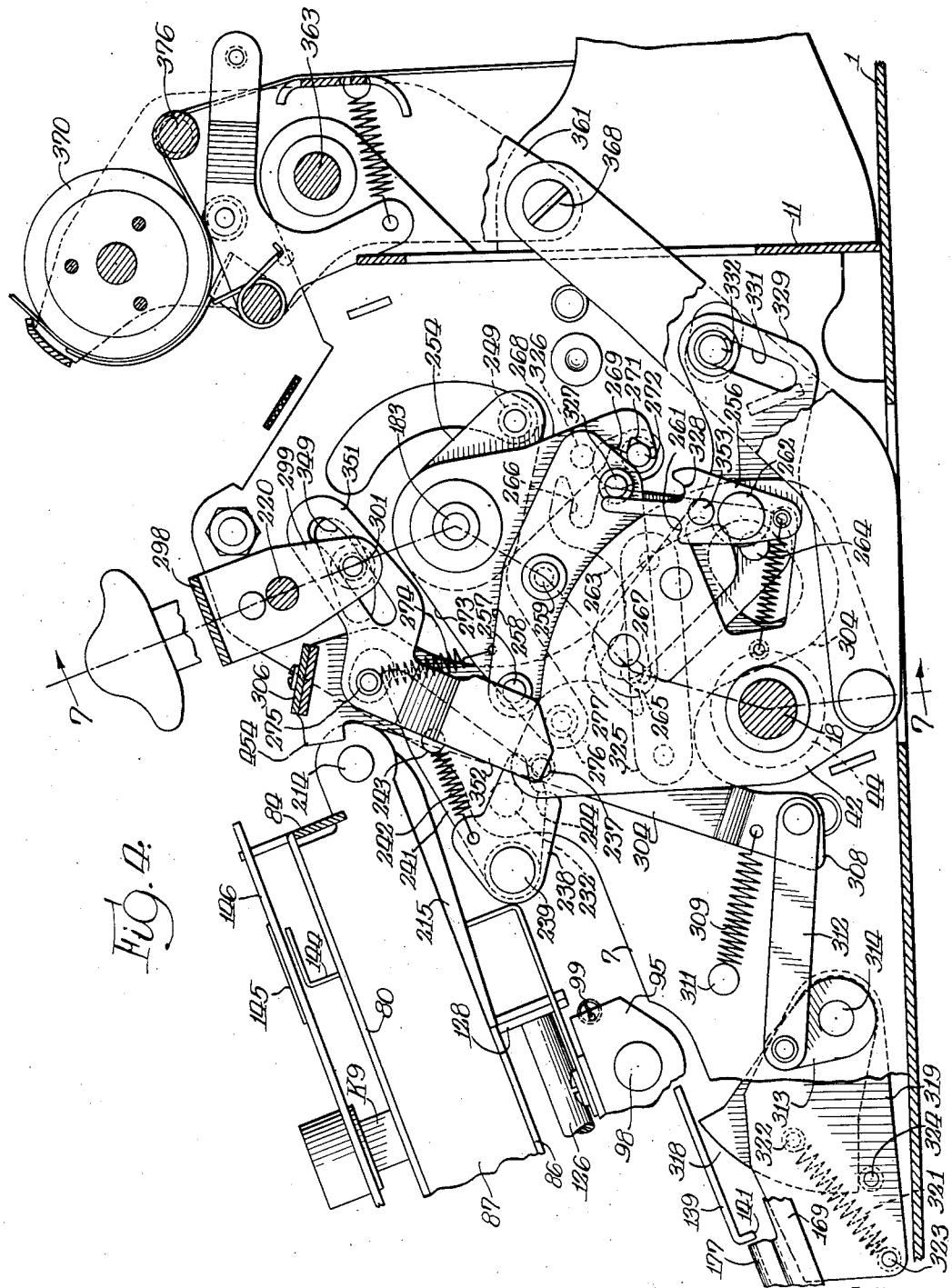
BY *Thomas O. Mehan*
*Frank J. Foley* ATTORNEY.

Nov. 1, 1949    T. O. MEHAN    2,486,959
CALCULATING MACHINE
Original Filed Jan. 15, 1940    18 Sheets-Sheet 4
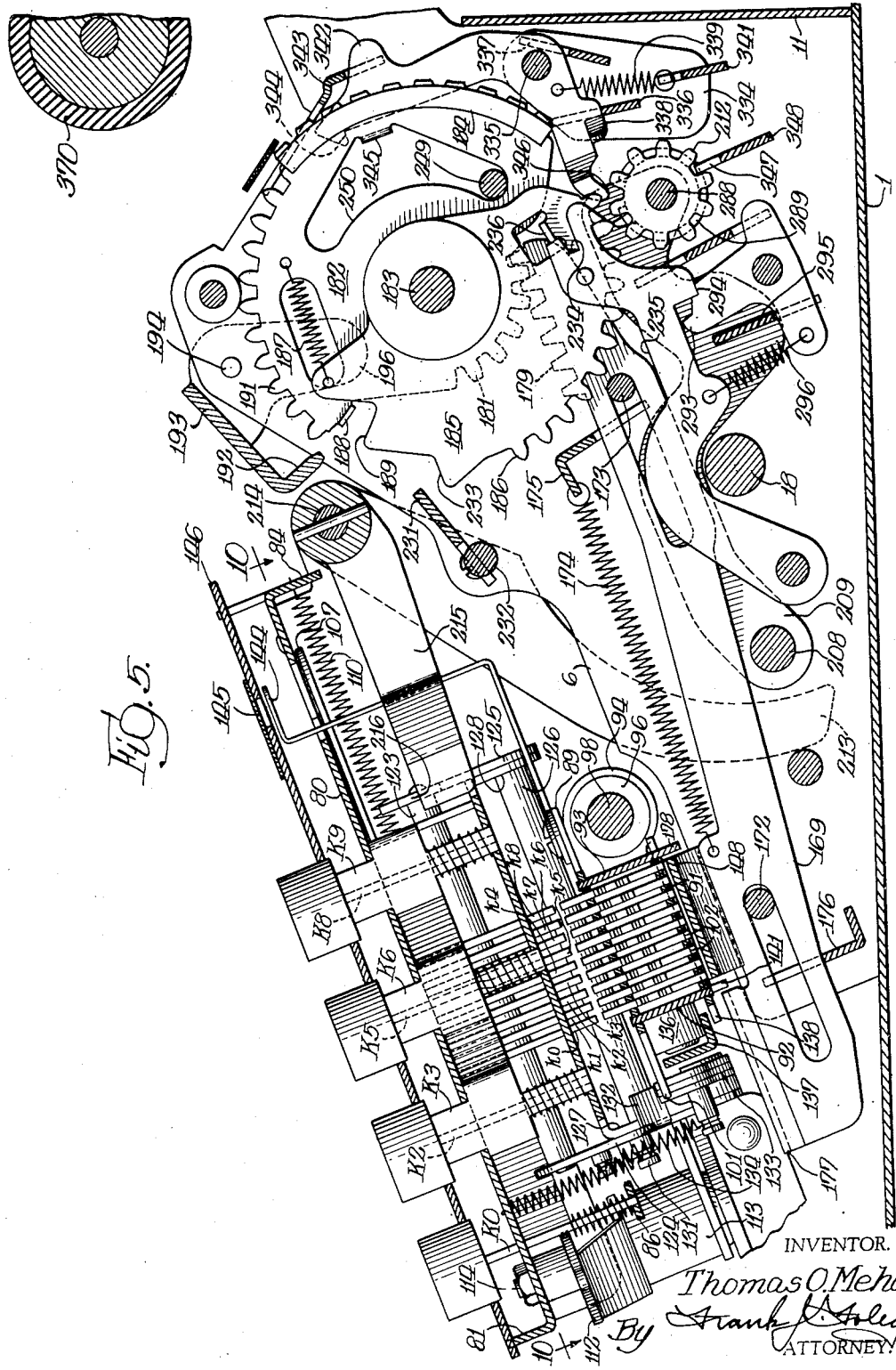
INVENTOR.
Thomas O. Mehan,
By Frank ~~~~
ATTORNEY

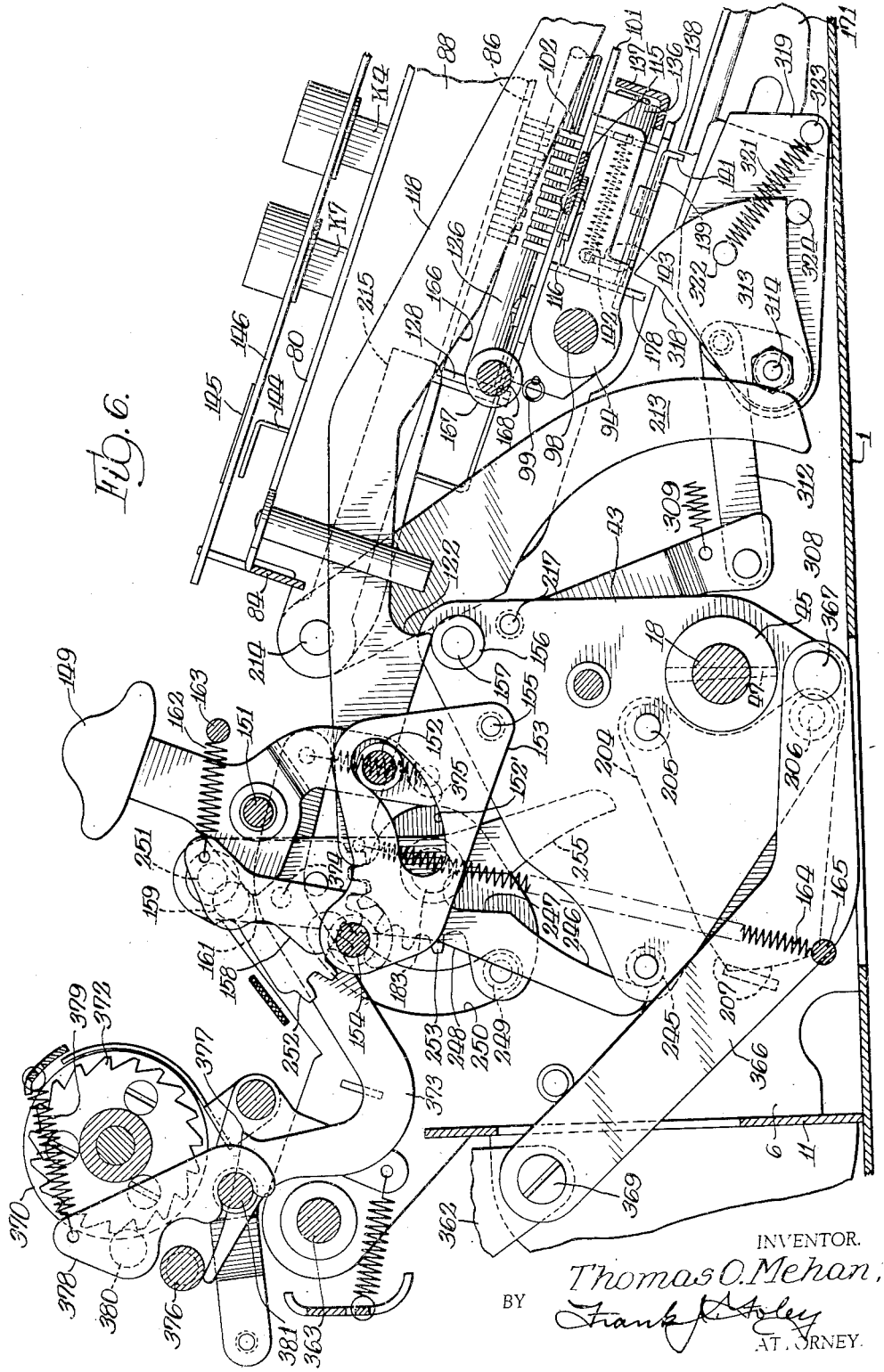

Nov. 1, 1949      T. O. MEHAN      2,486,959
CALCULATING MACHINE
Original Filed Jan. 15, 1940      18 Sheets-Sheet 6
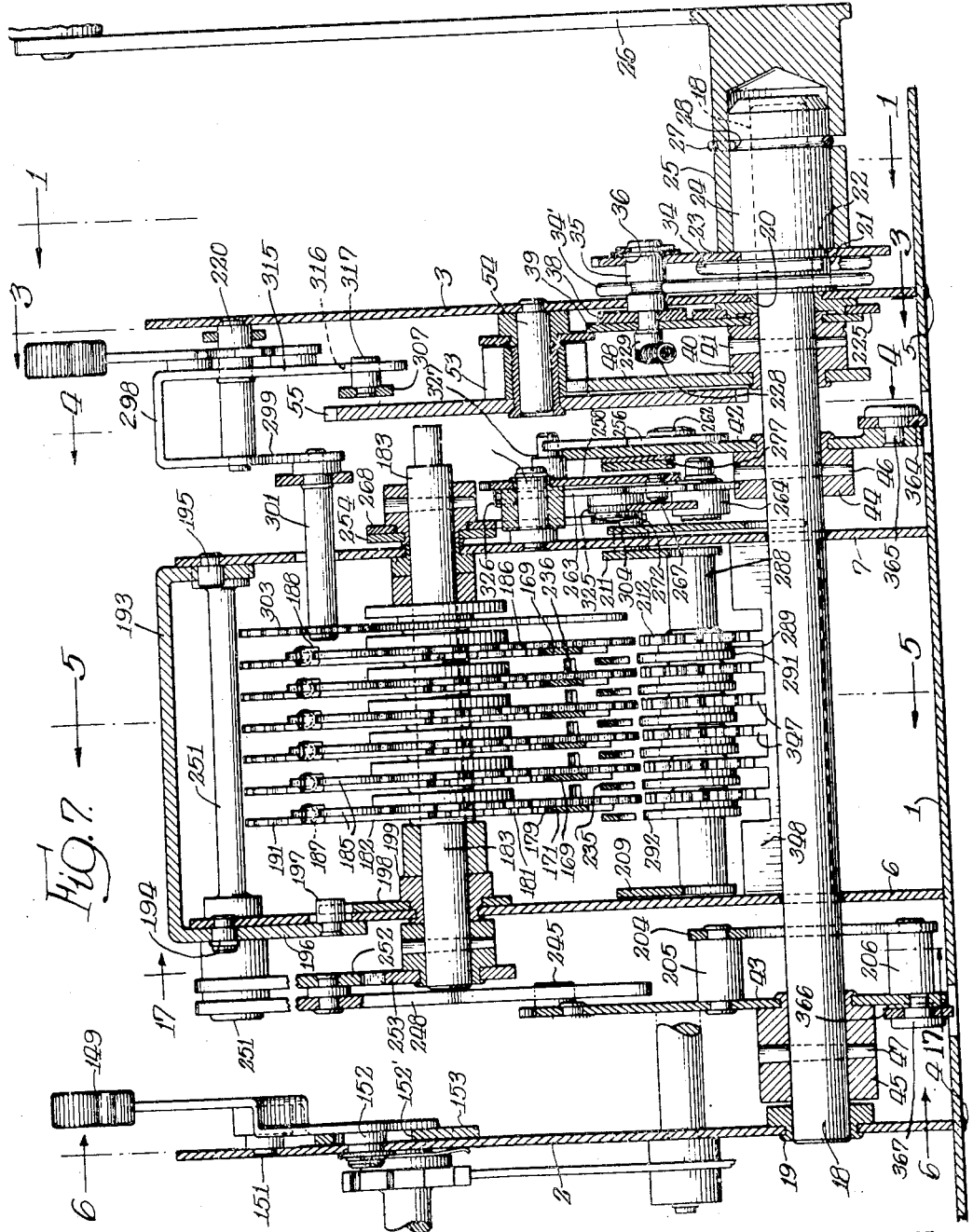
INVENTOR.
BY Thomas O. Mehan
ATTORNEY.

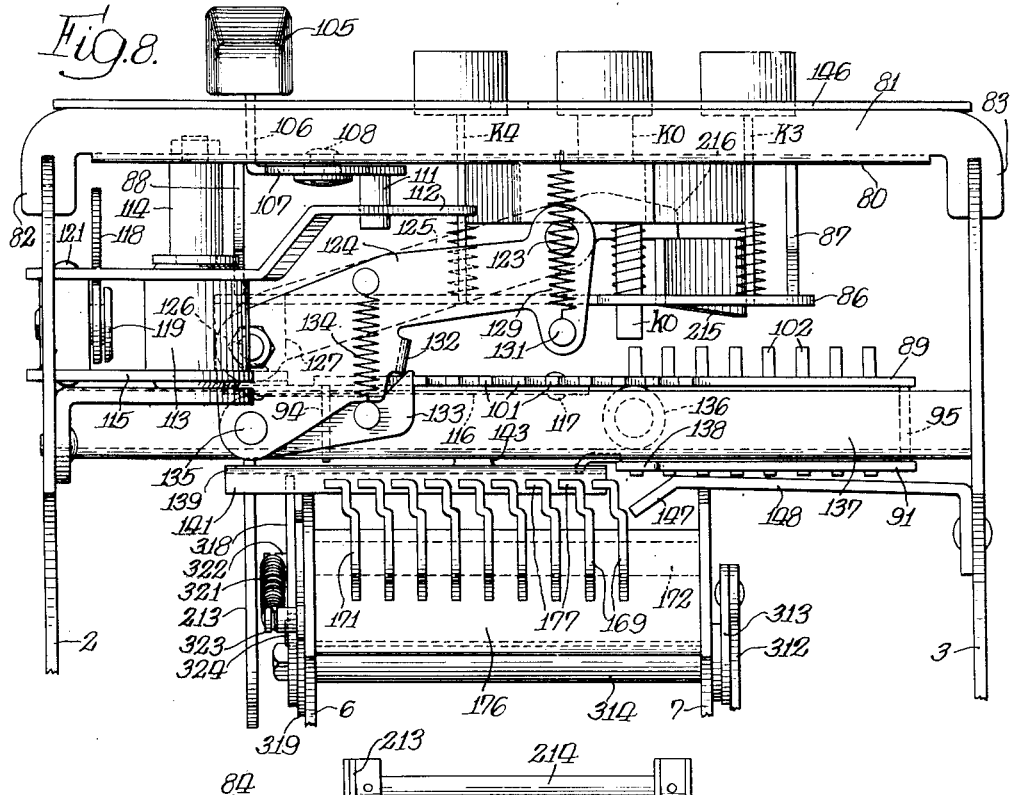

INVENTOR.
Thomas O. Mehan
BY Frank J. Foley
ATTORNEY.

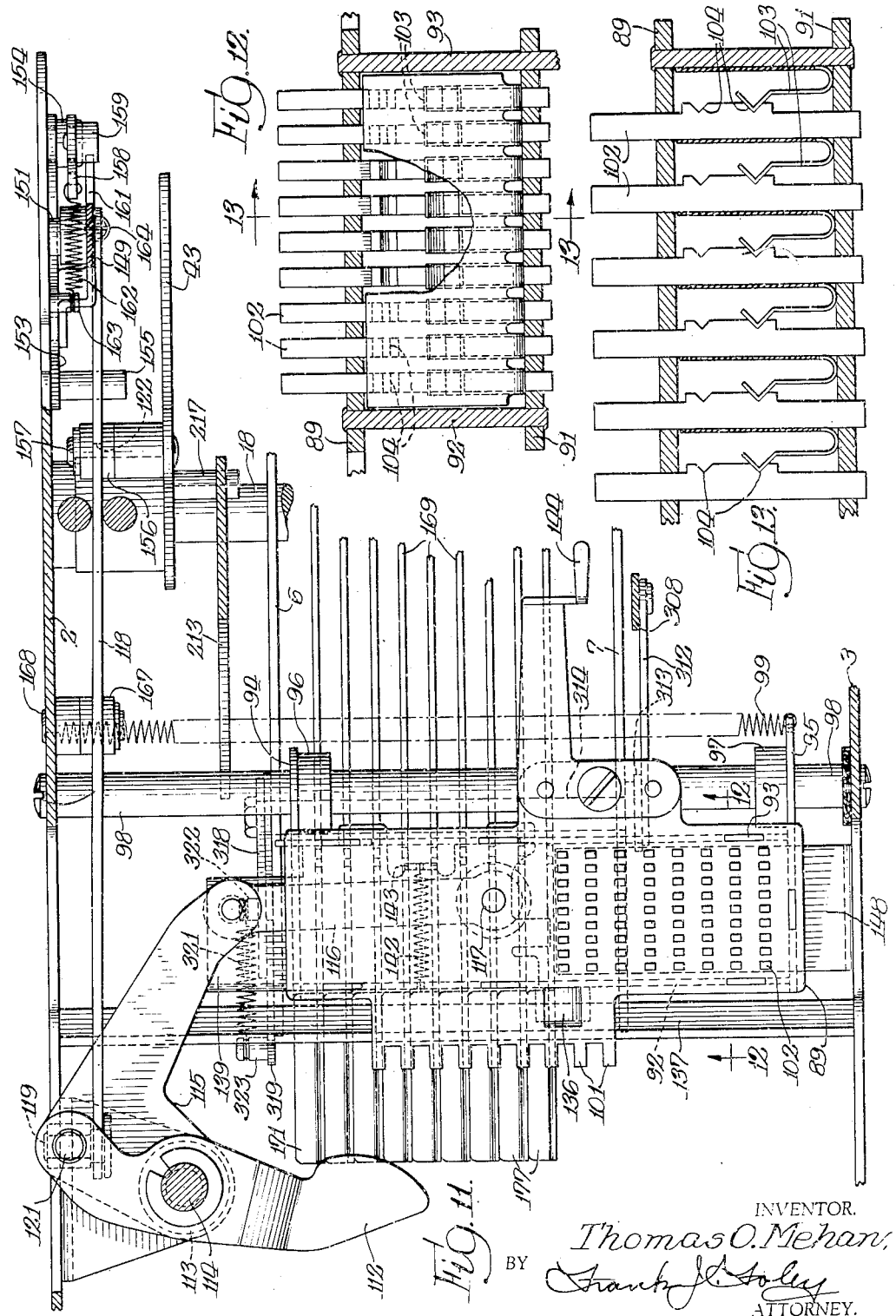

Nov. 1, 1949     T. O. MEHAN     2,486,959
CALCULATING MACHINE
Original Filed Jan. 15, 1940     18 Sheets-Sheet 10
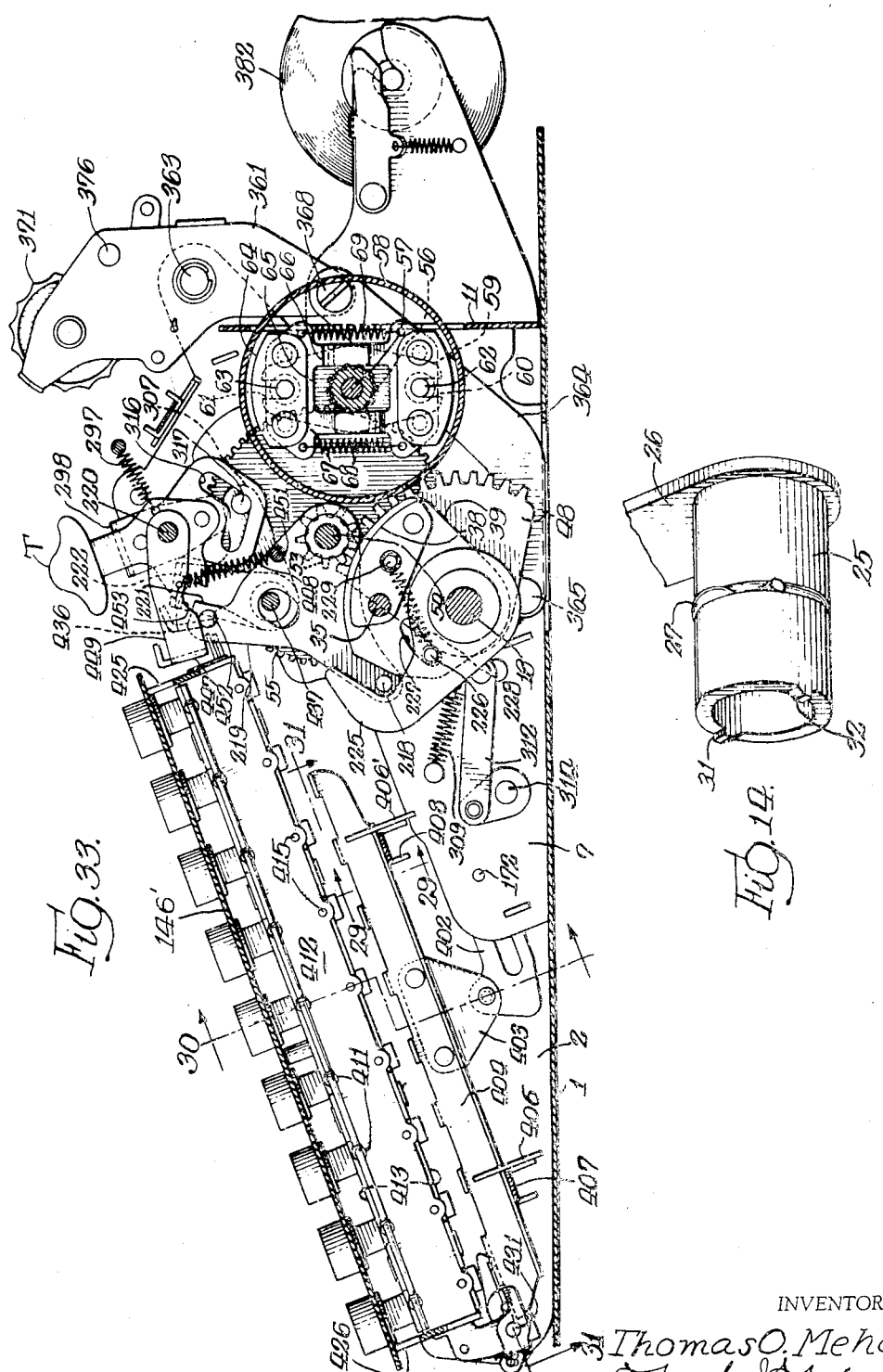
INVENTOR.
Thomas O. Mehan
Frank J. Soley
ATTORNEY.

Nov. 1, 1949  T. O. MEHAN  2,486,959
CALCULATING MACHINE
Original Filed Jan. 15, 1940  18 Sheets-Sheet 11
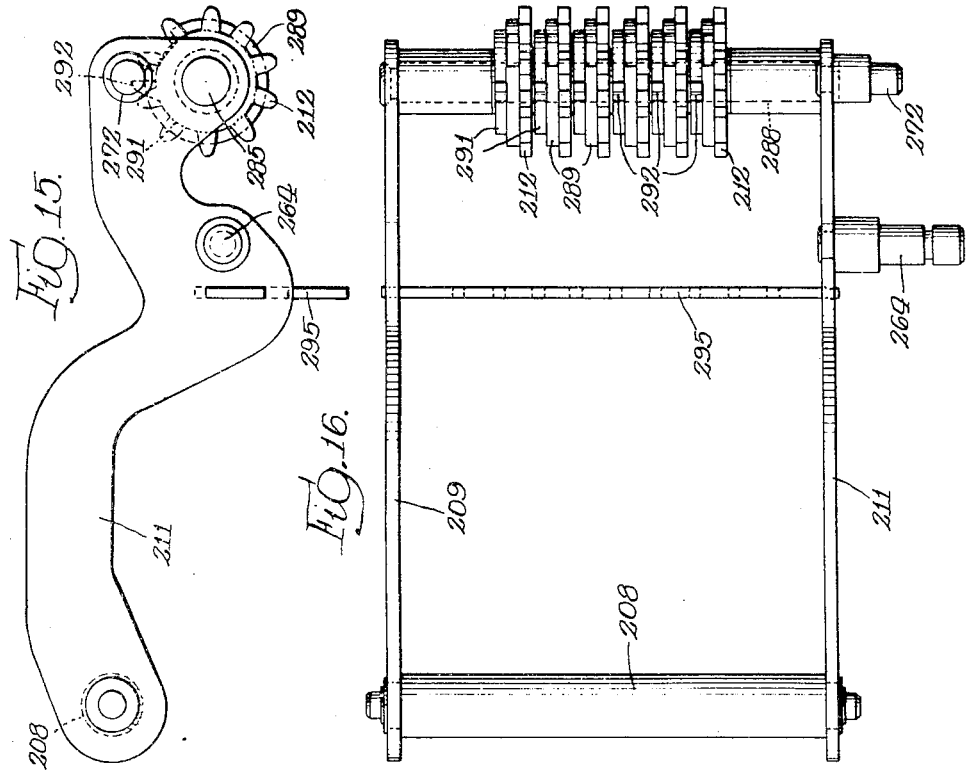
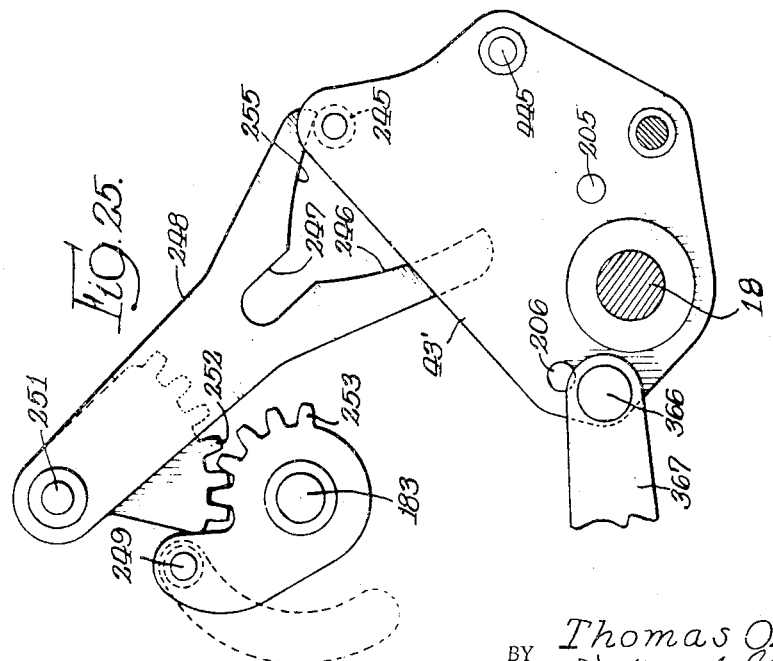
INVENTOR.
Thomas O. Mehan
BY
ATTORNEY.

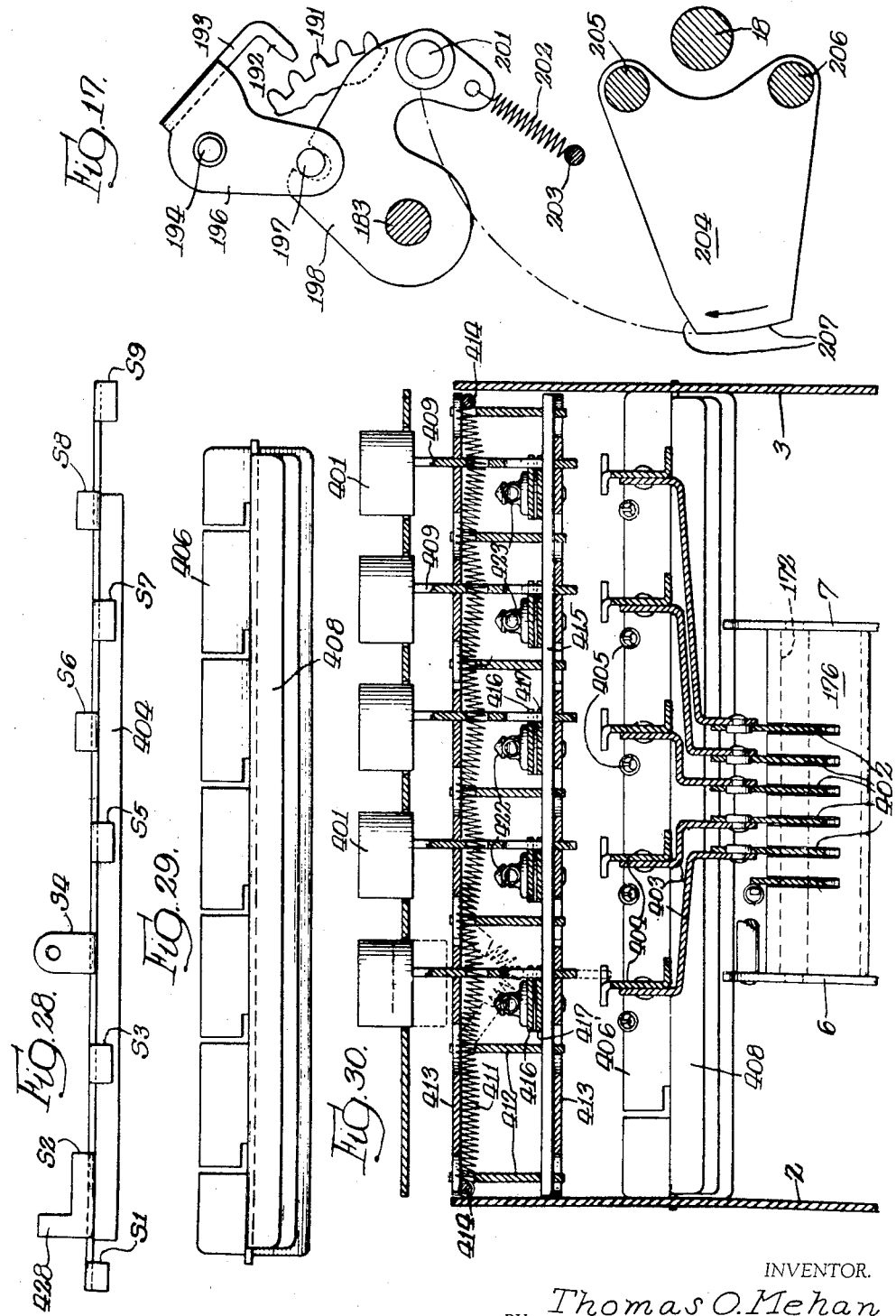

Nov. 1, 1949 T. O. MEHAN 2,486,959
CALCULATING MACHINE
Original Filed Jan. 15, 1940 18 Sheets-Sheet 13
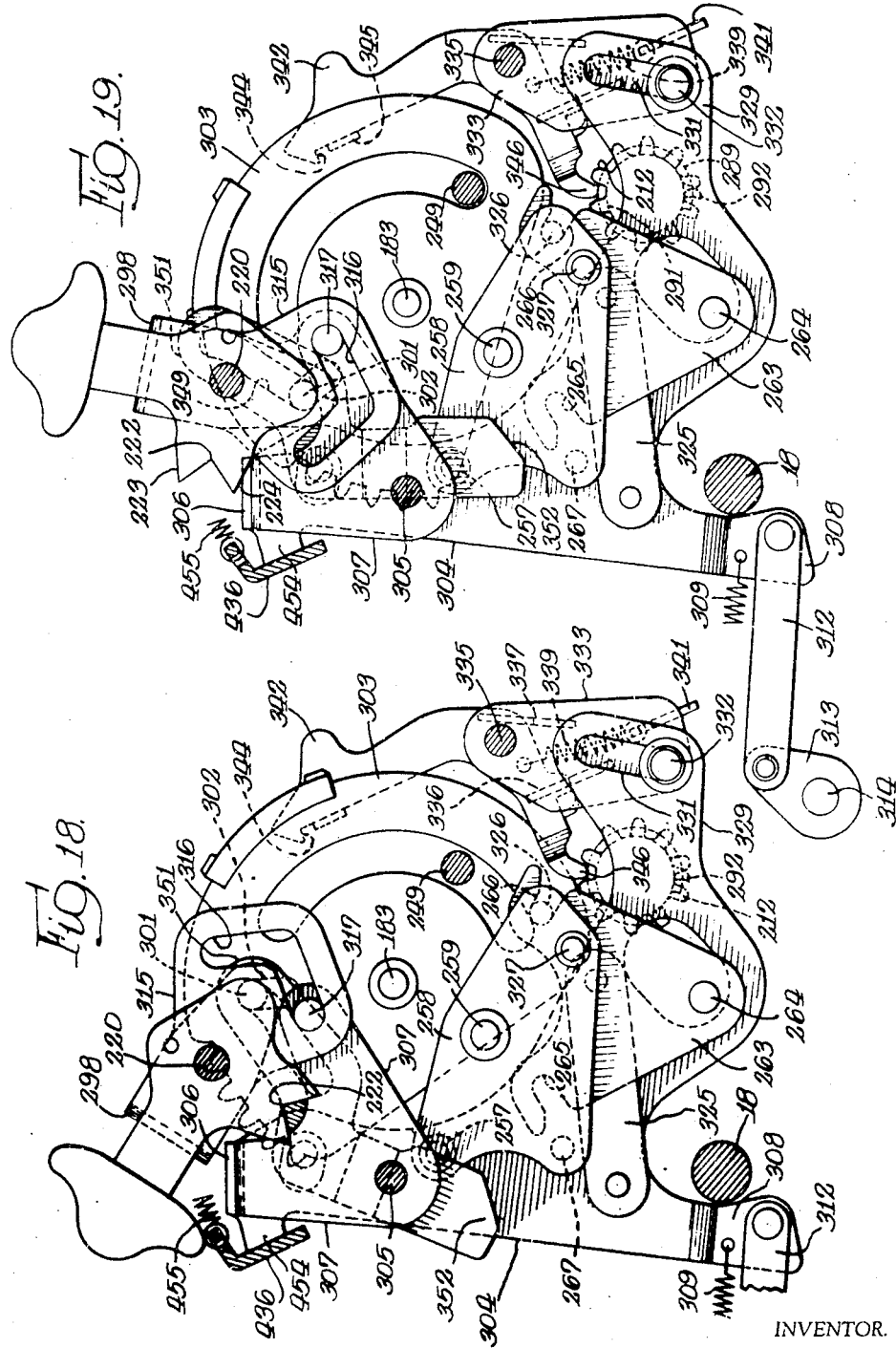
INVENTOR.
Thomas O. Mehan
BY Frank J. Foley
ATTORNEY.

Nov. 1, 1949  T. O. MEHAN  2,486,959
CALCULATING MACHINE
Original Filed Jan. 15, 1940  18 Sheets-Sheet 14
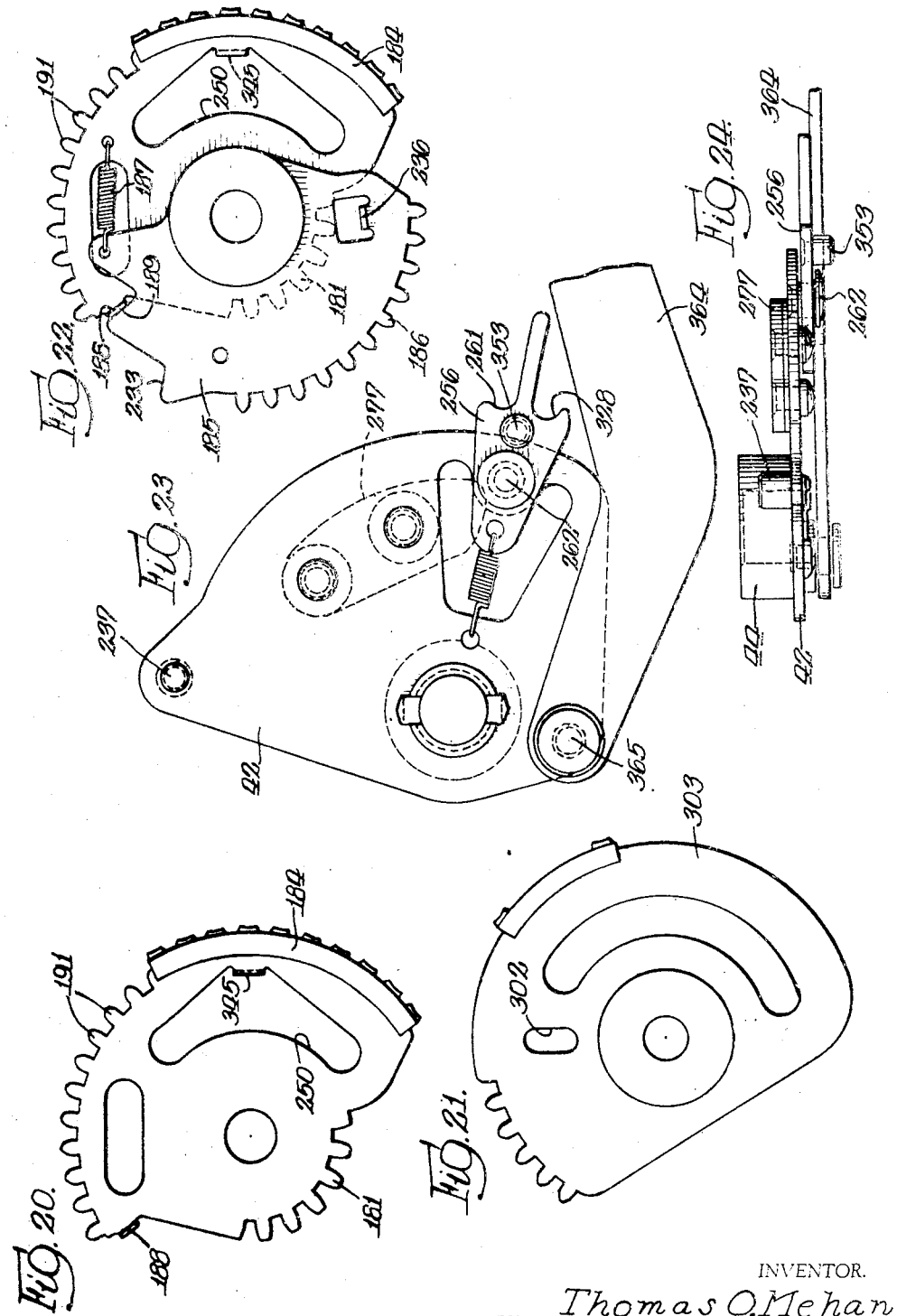
INVENTOR.
Thomas O. Mehan
BY
ATTORNEY.

Nov. 1, 1949  T. O. MEHAN  2,486,959
CALCULATING MACHINE
Original Filed Jan. 15, 1940  18 Sheets-Sheet 15

INVENTOR.
Thomas O. Mehan
BY Frank J. Foley
ATTORNEY.

Nov. 1, 1949

T. O. MEHAN 2,486,959

CALCULATING MACHINE

Original Filed Jan. 15, 1940

INVENTOR.
BY Thomas O. Mehan
Frank J. Foley
ATTORNEY.

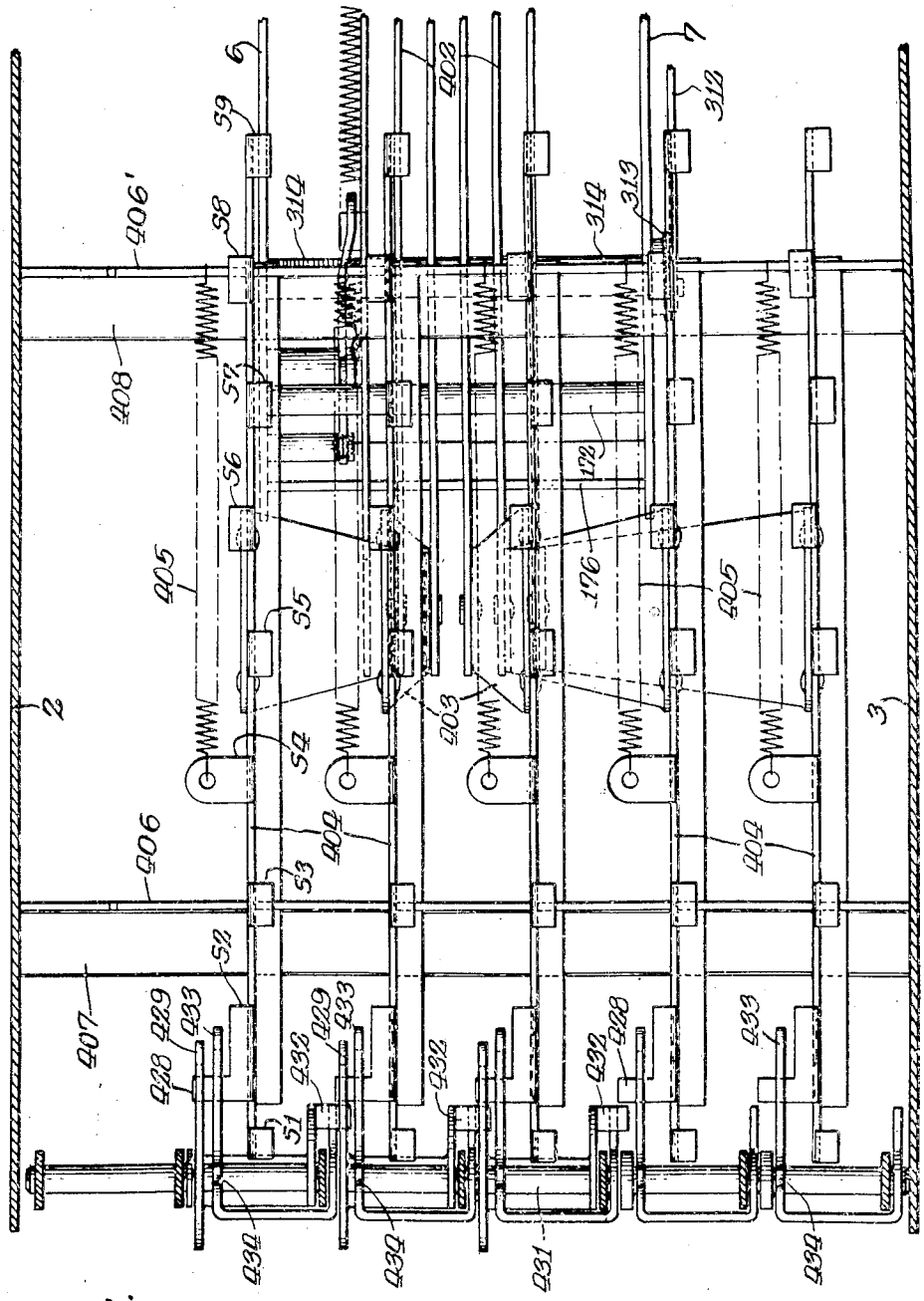

UNITED STATES PATENT OFFICE 2,486,959

CALCULATING MACHINE

Thomas O. Mehan, Park Ridge, Ill., assignor to Victor Adding Machine Co., Chicago, Ill., a corporation of Illinois Original application January 15, 1940, Serial No. 313,896. Divided and this application December 7, 1944, Serial No. 566,980

2 Claims. (Cl. 235—60)

The general object of this invention is to provide a calculating machine having printing and adding mechanisms so designed and constructed as to permit them with minor changes to be adapted for control either by 10-key keyboards or full-key keyboards.

Another object of the invention is to provide the foregoing features made in accordance with such design that the number of denominations capable of being printed and added may be increased from the minimum commercial requirements to the maximum commercial requirements merely by the addition of units which duplicate the units required in the smaller capacity machines.

Another object of the invention is to provide calculating machines containing the above features and advantages and further designed that substantially the same frame and casing may be used in either the 10 or full-key machines.

Another object of the invention is to provide a calculating machine which may be interchangeably controlled by a 10-key or full keyboard, neither of which will require an idle operation to prepare for a totalizing operation and in either of which the repeat, total and sub-total keys are manipulated by the operator in the same manner.

Another object of the invention is to provide the foregoing features and advantages in machines that are peculiarly adapted for compact and lightweight construction thereby making them especially suitable as portable machines and making all of these advantages available at exceptionally low costs to the users.

A further object of the invention is to provide the foregoing features and advantages in such a manner that the machine with either keyboard may have the same overall height and other dimensions and may employ the same casing.

To illustrate the invention I have shown in the accompanying drawings the full details of the adding and printing mechanisms, the full details of the 10-key and full keyboard control units, and the manner in which either may be applied for controlling the adding and printing mechanisms.

The details of construction of the full keyboard control unit, and the adding and printing mechanisms including the platen and paper feeding apparatus are fully disclosed and claimed in my co-pending application Serial #282,787, filed July 4, 1939, which has been abandoned.

Fig. 1 is a longitudinal vertical sectional view taken approximately on the line 1—1 of Fig. 2.

Fig. 2 is a plan view showing an adding machine provided with 10 keys.

Fig. 4 is a partial sectional view on the line 4—4 of Fig. 7.

Fig. 5 is a sectional view on the line 5—5 of Fig. 7.

Fig. 6 is a skeleton view partially in section on the line 6—6 of Fig. 7.

Fig. 7 is a view partially in section on the broken line 7—7 of Fig. 4.

Fig. 8 is a sectional view on the line 8—8 of Fig. 1.

Fig. 9 is a plan view of the keyboard equipped with 10 keys.

Fig. 11 is a plan view of the front end of the machine with the keyboard removed and disclosing the movable pin carriage.

Fig. 12 is a vertical sectional view on the line 12—12 of Fig. 11.

Fig. 13 is a vertical sectional view on the line 13—13 of Fig. 12.

Fig. 14 is a perspective view of the handle hub 25.

Fig. 15 is a side elevation of the swinging accumulator frame assembly.

Fig. 16 is a plan view of the accumulator frame assembly.

Fig. 17 is a skeleton view showing the rectifier bar and its operating means, as viewed from the plane of the line 17—17 of Fig. 7.

Fig. 18 is a view showing the position of some of the parts when the total key has been rotated to total-taking position.

Fig. 19 is a view showing the same parts when the total key has been operated to sub-total position.

Fig. 20 is a side elevation of a numeral type sector wheel.

Fig. 21 is a side elevation of a signal type sector wheel.

Fig. 22 is a side elevation of an assembly of a type sector wheel and adding sector.

Fig. 23 is a side elevation showing the control pawl arm assembly.

Fig. 24 is a top plan view of the same assembly.

Fig. 25 is a view showing the rack restore gear mechanism rotated to full forward stroke position as it functions with either the 10-key or full keyboard machines. A difference between the cam plate 43' shown in Figure 25 and the corresponding cam plate 43 shown in Figure 6 will be noted and explained hereinafter, the latter cam being employed on the 10-key machine and the 43' cam being employed on the full key machine.

Figure 26:
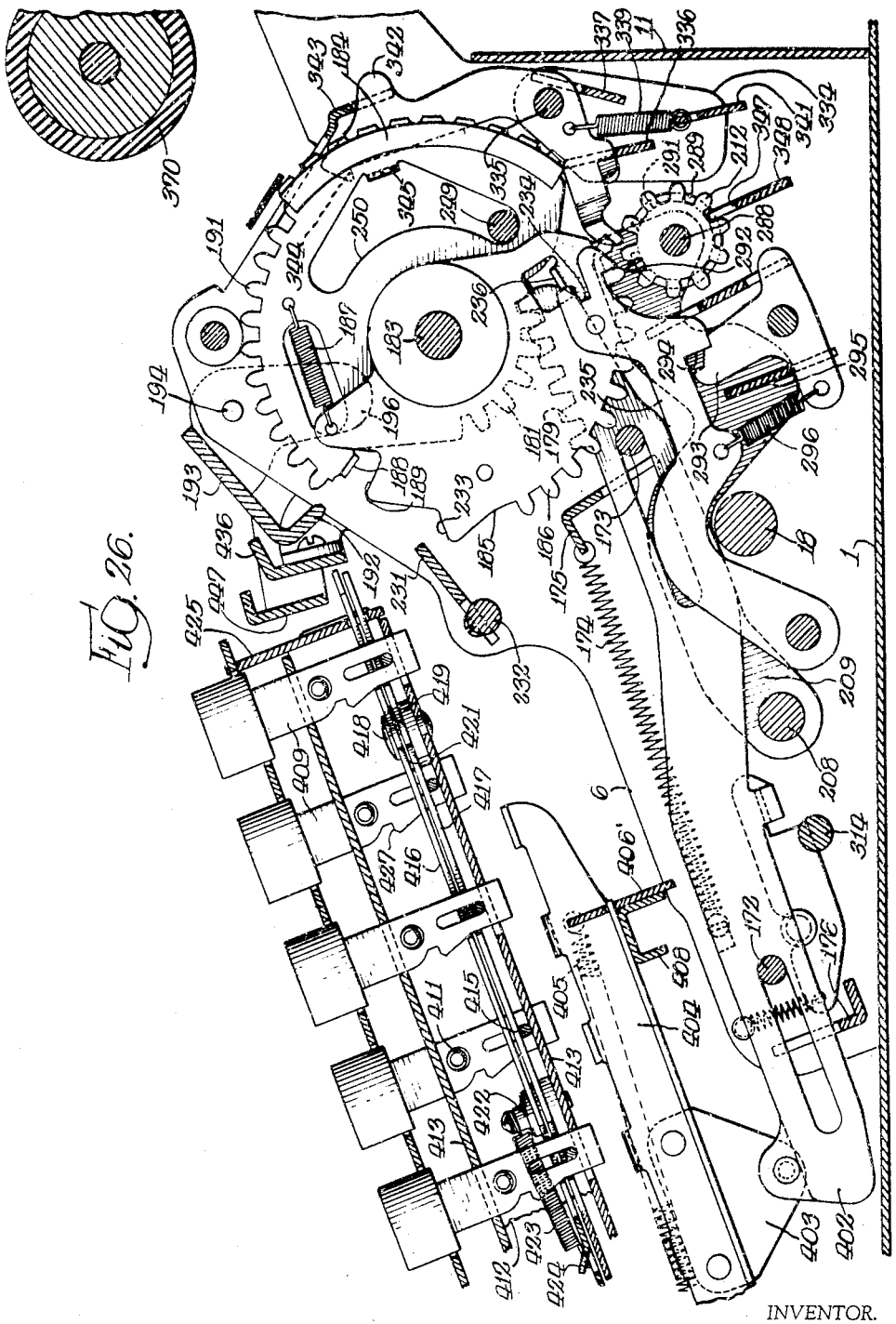

Fig. 26 is a sectional view taken approximately on the line 5—5 of Fig. 7.

Figure 27:
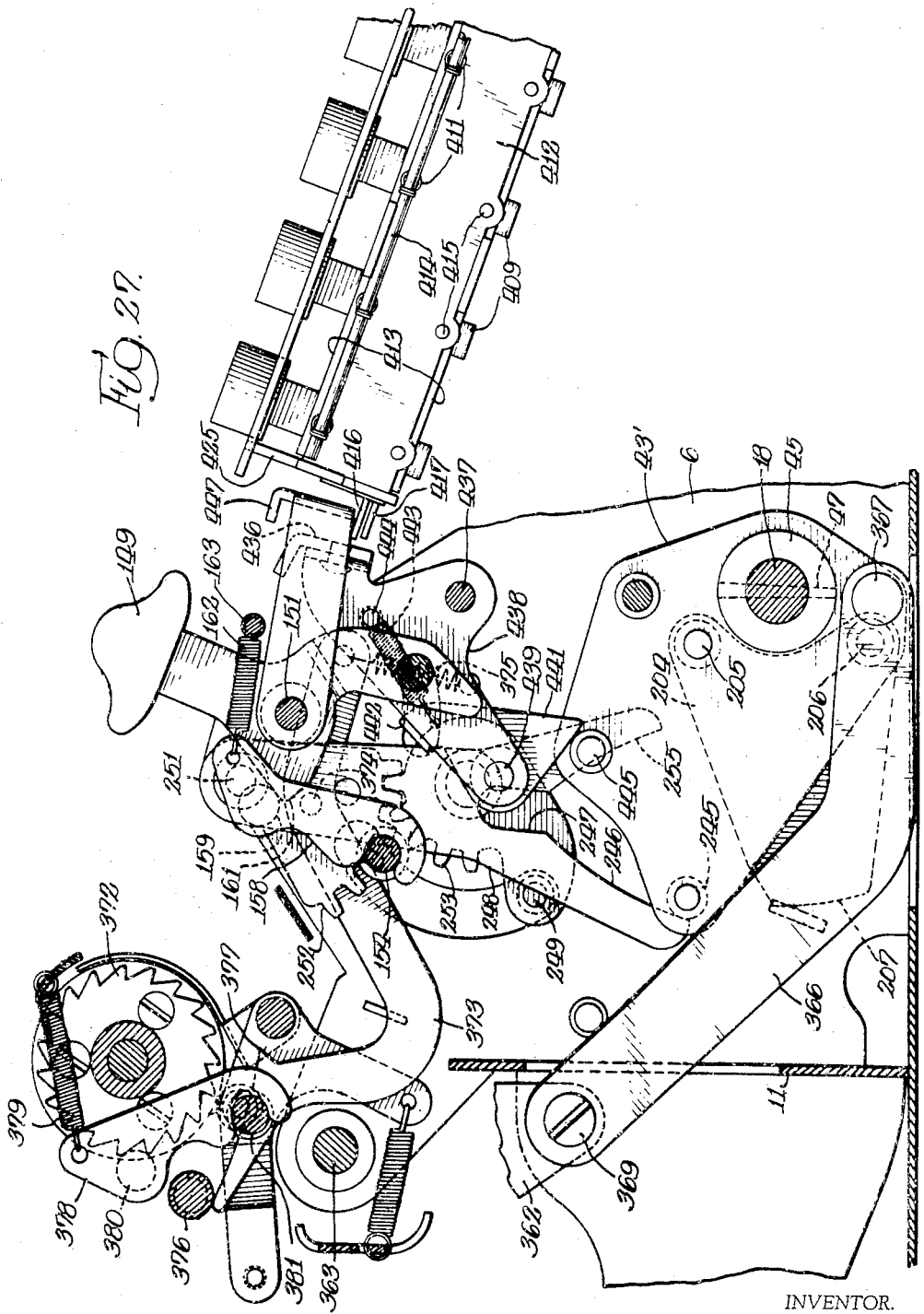

Fig. 27 is a diagrammatic view partially in section on the line 6—6 of Fig. 7.

Fig. 28 is a top plan view of a typical stop slide employed in the full keyboard machine.

Fig. 29 is a partial sectional view on the line 29—29 of Fig. 33.

Fig. 30 is a sectional view on the line 30—30 of Fig. 33.

Fig. 31 is a sectional view on the line 31—31 of Fig. 33.

Figure 32:
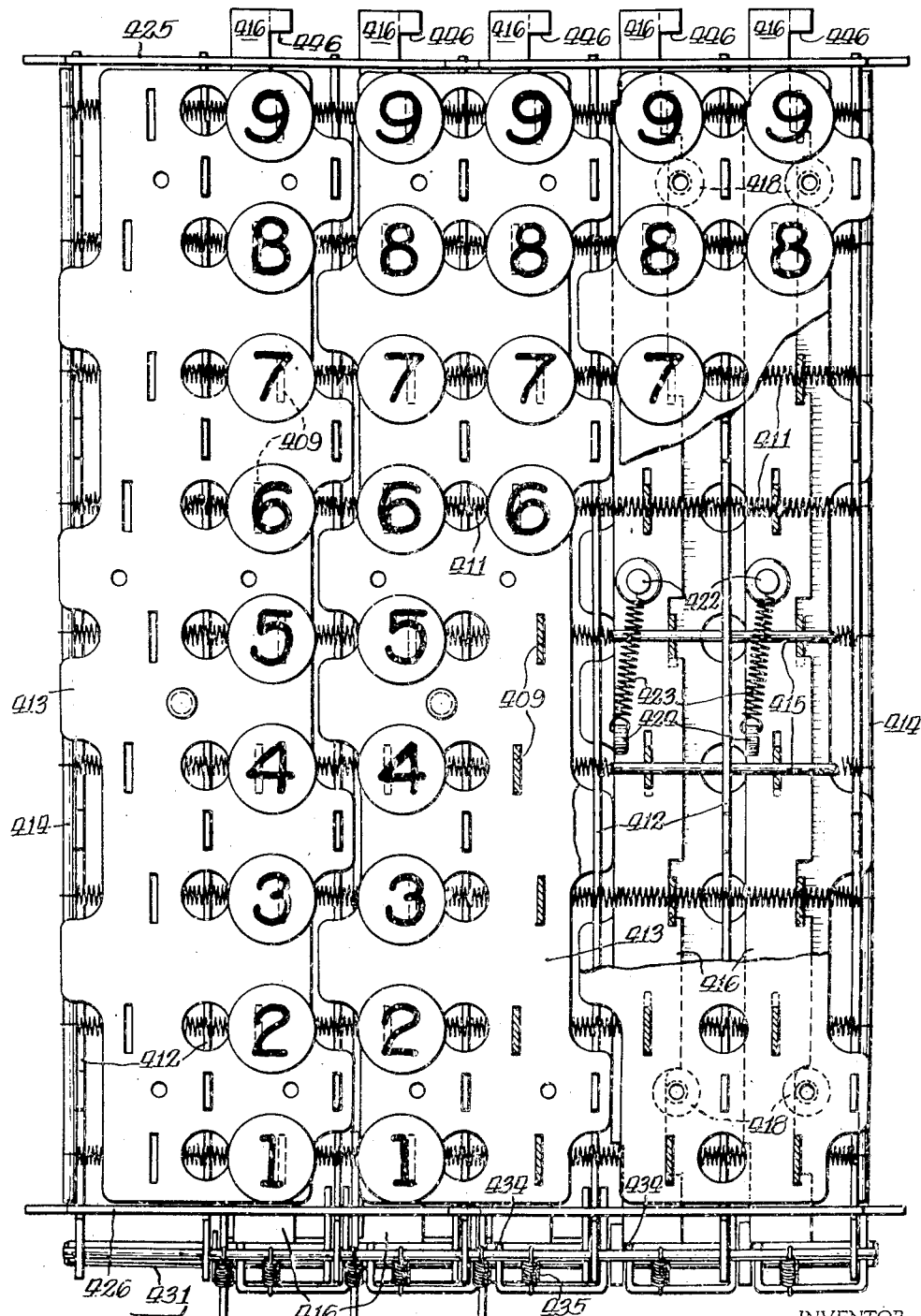

Fig. 32 is a plan view partially in section of a full keyboard assembly unit.

Fig. 33 is a sectional view substantially on the line 3—3 of Fig. 7.

General frame

The frame of the machine comprises a base plate 1, on which are mounted a pair of main side frame plates and a pair of intermediate frame plates. The vertical side plates 2 and 3, as shown in Fig. 7, are secured to the base plate by means of several short projections similar to the projections 4 and 5 which extend through the base plate and are swaged to overlap the narrow slots through which these projections extend. This form of connection is not only simple and economical but is exceedingly firm and durable and is used extensively throughout this machine, as will later appear.

The intermediate vertical frame plates 6 and 7 are secured to the base plate in like manner, by swaged projections.

To cover these swaged connections and various openings which are provided in the base plate, I employ a cover plate 8 on which are mounted a plurality of rubber feet such as 9, a layer 10 of felt being preferably interposed between plates 8 and 1. The covering plate may be secured to the base plate by screws.

The main side plates are rigidly secured together at the rear end by means of the vertical plate 11, swaged projections such as 12 extending through the vertical plate from the side frame plates to form this connection. The front end of the main side frame plates are connected by a plate or cross bar 13 (see Fig. 2).

Several projections (not shown) from the bottom edges of the main frame plates likewise extend through (slots not shown) the base plate and are swaged to lock the plates together.

Dowel pins such as 14 are provided on the base plate at the four corners to aid in positioning the cover 15. The cover may be locked to the base plate by means of a pair of identical latches on opposite sides of the machine, one latch 16 being shown in Fig. 1 engaging a slot 17 provided in a vertical reinforcing rib on the inside of the casing.

It will be observed that the main frame and cover assembly herein described is substantially identical with the assembly and cover employed in my full keyboard adding machine, the latter being the subject matter of a co-pending application, Serial No. 282,787, filed July 4, 1939.

Full stroke mechanism

The full stroke mechanism herein employed is identical with that shown in the above mentioned co-pending application.

The main drive or operating shaft 18 is journalled in the side plates in bushings 19 and 20. A sleeve 21 mounted on the shaft 18 is provided with a reduced portion 22 in which is disposed a full stroke ratchet plate 23. Outside of the latter and abutting the same is another sleeve 24 onto which may be slipped the hub 25 of the operating handle 26. A wire spring 27 which partially surrounds and in part extends through the hub 25 engages the groove 28 in sleeve 24 to aid in retaining the handle hub on the sleeve. The plate 23 is provided with slots 29 and 30 into which extend projections 31 and 32 from the hub of the operating handle whereby the forward rotation of the handle will positively drive the full stroke plate 23.

Secured to the ratchet plate 23 is a post 33 against which rests one end of a spring 34, the other end 34' of which after passing about the sleeve 21 rests against a post 35. The latter post extends through the arcuate slot 36 in the plate 23 and is provided with a washer 37 which rides on the outside margins of said slot. The post 35 is secured through the cam 38 to the total key lock cam and operating plate 39.

The assembly of the crank handle and ratchet plate is free to rotate on the sleeve 18, whereas the operating plate 39 is non-rotatably secured upon hub 40, which is non-rotatably secured to the shaft 18 by means of the pin 41. Hence, if the shaft is held against rotation through any cause whatsoever, at the time when the handle is being rotated forwardly, the handle hub assembly will merely rotate on the shaft 18 and will not drive the operating plate 39. Instead thereof, the spring 34 will merely be wound more tightly about the sleeve 21, its opposite ends merely being brought more closely together as the plate 23 rotates with the handle hub. However, if the machine is in condition to be operated, the forward rotation of the handle will enable the driving spring 34 to rotate the plate 39, thus imparting a forward rotation to the main shaft 18.

Likewise, non-rotatably secured on the shaft 18 are the plates 42 and 43, these plates being secured to the bushings 44 and 45, which as shown are pinned to the shaft by pins 46 and 47. A fourth plate non-rotatably mounted on the shaft 18 is the sector gear 48, secured to the bushing sleeve 40.

Cooperating with teeth 49 on the full stroke sector is a pawl 50 in the form of a bail pivoted at 51 on the side plate 3, the other symmetrically shaped end of the bail being adapted to ride over the surface of the cam 38. The spring 52 secured to the bail normally holds the bail in the position shown in Fig. 1.

In order that the mechanism driven by the main shaft 18 may have ample time to operate even if the handle should be pulled forwardly at an excessive speed, there is provided a governor driven by the sector gear 48, meshing with a pinion gear 53 (Fig. 7), the latter being rotatably mounted on a trunnion 54, supported on the side plate 3. Keyed or otherwise secured to the gear

53 is a larger gear 55, which meshes with a small pinion gear 56 keyed to the shaft 57 of a governor mounted in the casing 58. A plate 59, having slots 60 and 61 in its opposite ends, is secured on the shaft 57 to rotate therewith. Within the end opening slots of the plate 59 rests a pair of pins 62 and 63, carried on the diametrically opposite brake assemblies, each of which consists of a shoe such as 64, mounted on a plate 65 (Fig. 3), from which extends two legs 66 and 67. The two brake assemblies are identical and complementary and are connected together by springs 68 and 69. It will be apparent that when the governor shaft is rotating beyond a predetermined speed, centrifugal action will cause the brake shoes to rub against the inside surface of the governor casing and thereby retard the speed of the shaft 57, and acting backwardly toward the gears will retard the speed of the main operating shaft.

As shown in Fig. 1, to a pin 70 carried on the bottom of the full stroke sector 23 is connected a link 71, pivotally connected to another link 72, the latter being connected to the return spring 73 anchored on the pin 74 carried on the side plate 3.

As will now be understood, when the operating handle is pulled forwardly, that is, in a counterclockwise direction, according to the view of Fig. 1, the full stroke sector being positively driven by the handle will likewise rotate and, if the machine is in condition to be operated, the heavy coil spring 34, acting through the pin 35 and plate 39, will rotate the main shaft in a counterclockwise direction. If the handle is rotated forwardly too rapidly, the governor described above will exert a drag on the main shaft through the gear 48 and the yielding driving connection, though the handle continues to rotate forwardly. However, once the pawl 50 has begun to drag over the teeth 49 on the full stroke sector during the forward stroke, the handle cannot be returned rearwardly until the sector plate 39 has been rotated to its full forward position. Until such time the cam 38, which is riveted to the plate 39, will not have cleared the inner leg of the pawl 50. Any attempt to return the handle will cause the pawl to engage the teeth 49 and prevent such return. And this will occur, even though the teeth 49 have already cleared the outer leg of the pawl 50, the cam 38 serving to hold the pawl pointed in the right direction to strike the first tooth which rotates backwardly toward it. However, when the full forward stroke has been completed, as indicated by the full forward rotation of the sector plate 39, the double pawl 50 will be free, and the return spring 73 may then rotate the full stroke sector 23 back to starting position, the pin 35 then resting in the end of the arcuate slot 36, bringing the main shaft back to original position. The length of the slot 36 is such that the handle may be rotated forwardly about a full stroke even though the sector plate 39 does not move at all. The full stroke sector and the reversible pawl 50 also prevent the handle from being pulled forwardly while the operating shaft is still engaged in a return stroke.

The projections 31 and 32 shown in Fig. 14 on the end of the handle hub are so shaped as to cause the handle to positively drive the full stroke sector on the forward stroke. The taper on the rear faces of these projections may be so shaped that undue forcing of the handle rearwardly when the full stroke sector is held stationary will cause the handle to become disengaged.

Keyboard and carriage

As indicated heretofore, the machine has been designed for use either with a full keyboard or 10-key board. Either keyboard assembly will provide settable stops to limit the travel of rack members which in turn control the adding and printing mechanisms. The printing and adding mechanisms and the driving mechanism are the same for either the full keyboard or the 10-key machines, but certain minor but necessary changes in the repeat key and total key mechanisms are required to adapt the machine to control by either of the two keyboard units.

Figure 10:
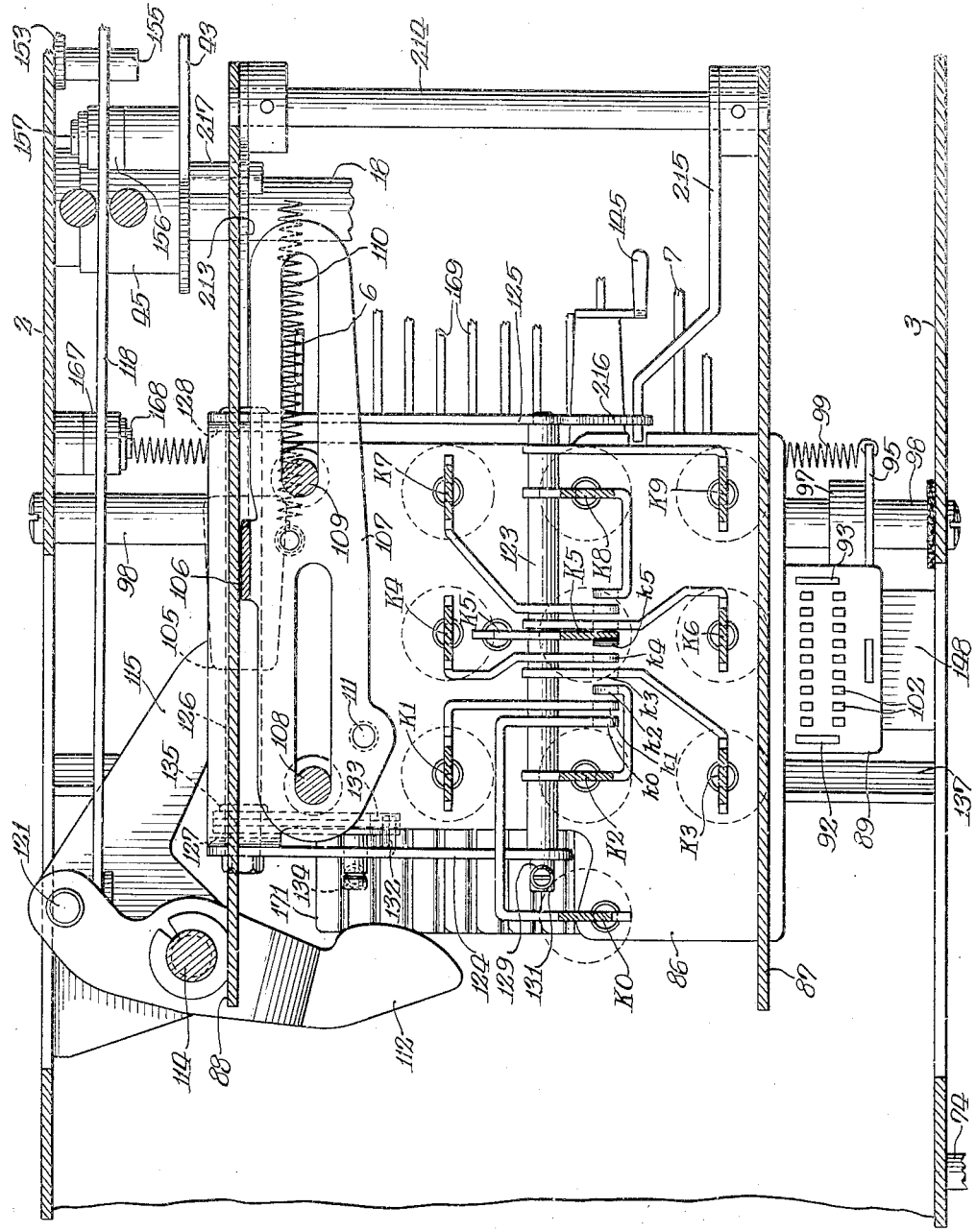
Fig. 10 is a sectional view on the line 10—10 of Fig. 5.

In the 10-key machine herein illustrated, the keyboard unit, shown particularly in Figs. 8, 9 and 10, is designed as an integral unit which may be readily mounted on or detached from the machine, finding its support on the main side frame plates as does the full keyboard unit. The top plate 80 of this unit is formed with an upstanding flange 81, the ends of the flange being curved downwardly at 82 and 83 and provided with notches which register with corresponding notches in the side frame plates. The rear edge of the plate is fashioned into a downwardly extending flange 84 whose ends are likewise provided with notches registering with notches in the side frame plates. Thus, the keyboard unit is accurately registered and it may be locked in place by means of locking plates such as 85 shown in Fig. 1, the slot of which embraces the protruding end of the flange 84. A bottom plate 86 on the removable keyboard unit is spaced from the top plate by means of longitudinally extending members 87 and 88, these three elements being rigidly connected by interlocking swaged projections formed on the vertical members 87 and 88.

The key stems for the ten numeral keys shown in Fig. 9 are slidably supported to reciprocate through slots in the upper and lower plates, the positions of these key stems being indicated in Fig. 10 by the reference characters K0, K1, K2, K3, K4, K5, K6, K7, K8, and K9. As shown in Fig. 10, each key stem has formed integrally therewith a rigid arm whose functioning with the travelling stop pin carriage will be described below.

The stop pin carriage is mounted for reciprocation transversely of the frame and includes a top plate 89 and a bottom plate 91 which are rigidly connected together by vertical plates 92 and 93, projections from the latter extending through the horizontal plates and being swaged to make a rigid unit. At opposite ends of the carriage are end plates 94 and 95 formed integrally with bearing sleeves 96 and 97 which slide on the cross rod 98 carried between the side frame plates of the machine. Thus, the carriage is accurately guided in its reciprocation. The spring 99 (see Fig. 11) anchored to the side frame 2 tends to pull the carriage toward the left side of the machine.

To regulate the movement of the carriage, one margin of the top carriage plate 89 is provided with teeth 101 which form an escapement rack. The keyboard is equipped with an escapement pawl which is operated each time any of the ten numeral keys are actuated, and thereby the spring 99 is permitted to draw the carriage toward the left, one tooth at a time for each key operation. As the teeth 101 are spaced apart the same distance as are the rows of settable stop pins, the movement of the carriage from one row of stop pins to another is thus regulated.

The carriage in the illustrated embodiment is provided with eight rows of stop pins 102 and as shown in Fig. 13, the stop pins are slidably supported in the upper and lower plates of the carriage and are resiliently retained in either of their upper or lower positions by means of small flat springs 103 which are positioned to engage upper or lower notches 104 formed in the sides of the stop pins.

The stop pin carriage may be returned toward the right side of the machine either manually or automatically. For manual return I provide a slidable key 105 fixed on the key stem 106 (see Fig. 8) which is formed as an upward extension on a slotted plate 107 which slides underneath the top plate of the keyboard and is guided in its movements by the rivets 108 and 109. A spring 110 connected to a post on the plate 107 and the flange 84 of plate 80, thereby normally tending to restore this plate rearwardly. A downward extending post 111 on this plate is so arranged that when the key is pulled toward the front of the machine this post will strike the arm 112. The arm is fixed to a sleeve 113, which is rotatable on a post 114. Likewise fixed upon the sleeve 113 is an arm 115, pivotally connected with the link 116, which in turn is pivotally connected to the carriage at the rivet 117. Accordingly, when the carriage restoring key 105 is pulled toward the front, the post 111 acting through the arms 112 and 115 will restore the carriage to the right-hand side of the machine against the action of the spring 99.

The automatic return of the carriage after an adding operation is provided for by utilizing a long arm 118, pivotally connected to the arm 112 and 115 by means of the pins 119 and 121. The rear end of this arm 118 is provided with a hook 122 which is engaged by a post on a cam plate which oscillates with the main operating shaft, but which will be described later (see Fig. 6). Briefly, the arm 118 restores the carriage automatically just prior to the conclusion of the return stroke of the main operating handle.

As shown in Fig. 10, formed integrally with each key stem is a bar shaped and positioned to pass over the rod 123. Each bar, with the exception of the K9 bar, terminates in a downwardly extending finger which extends through the bottom plate of the keyboard in position for contacting the settable stop pins in the pin carriage. These fingers are indicated in Figs. 5 and 10 by the characters K0 to K8 inclusive. Each of the key stems K0 to K9 is surrounded with a coil spring which abuts the lower plate and a shoulder on each key stem for normally holding the key stems in raised position. Some of these springs are shown in elevation in Figs. 5 and 8.

In order that the actuation of each of the numeral keys may cause the carriage to move one step to the left, the key stem bars extend over the escapement bail rod 123 which is supported between a pair of arms 124 and 125, these arms being fixed on a rod 126 pivotally supported upon ears 127 and 128 formed integrally with the bottom plate of the keyboard. This assembly of the two arms and the cross rod 123 is normally held in raised position by a spring 129 connected to a post 131 (Fig. 8), on the arm 124 and anchored on the top plate of the keyboard. Formed integrally with the arm 124 is a dog 132 which cooperates with the pawl 133 and the escapement rack on the pin carriage to control the movement of the carriage from right to left. Whenever a numeral key is depressed, the assembly, consisting of the rod 123 and arms 124 and 125, which may be called the escapement bail, is pressed downwardly by the key and the dog 132 pushes the pawl 133 out of engagement with the escapement rack teeth. The dog prevents the rack from moving more than one tooth at a time and when the key is subsequently raised the pawl 133 becomes engaged between the rack teeth. The spring 134 resiliently holds the pawl upwardly, as shown in Fig. 8. This pawl is pivotally supported on the arm 124 by pin 135.

Mounted on the front vertical plate 92 of the carriage is a roller 136 which rolls along the track 137 supported between the main side frame plates of the machine (Fig. 5). To guard against the carriage being displaced upwardly from the track 137, I provide a projection 138 on the bottom plate of the carriage extending underneath the track (Fig. 5).

To retain all of the racks (later to be described) in their normal forward position, I provide on the carriage a plate 139, pivotally connected at its rear margin to the plate 93 and having a depending flange 141 which, as will be seen in Figs. 4, 5, 6 and 8, forms a stop in front of the racks. As shown in Figs. 6 and 11, a spring 142 is connected with the plate 92 of the carriage and to an upstanding flange 143 on this rack locking plate to resiliently hold the plate normally in downward position. As will be described later, when a total or sub-total is to be taken, this rack locking plate will be lifted against the action of spring 142 so that all of the racks shall be free to move rearwardly, if necessary, during the totalizing operation.

When the carriage is at the extreme right the rack locking plate 139 is in position to oppose the advance of all of the racks. As the carriage is stepped to the left by numeral key actuation, the locking plate will move with the carriage out of the path of such racks as are required to move to print the figure set up by the keys. All racks to the left of the highest ordinal to be printed will be held stationary by the locking plate. When the carriage has been stepped to the extreme left of its limit of travel by numeral key actuation, the locking plate will still oppose the advance of the rack bar at the extreme left of the unit. But when a total is to be taken the lifting of the locking plate by the total lever frees all of the racks.

A pointer 144 (Fig. 3) is secured to the top plate of the carriage and moves underneath a window 145 in the keyboard cover plate 146 to indicate, as the carriage is stepped toward the left by the operation of numeral keys, the denomination of the number which is set up at any given time in the machine.

In the operating of the 10 key board the actuation of the first numeral key will cause the associated key finger to project through the bottom of the keyboard and depress the correspondingly located settable pin in the first longitudinal row from the left in the carriage. As the key goes down, the dog 132 pushes the pawl 133 out of engagement with the rack teeth 101 but holds the rack and carriage until the numeral key is released. As the escapement bail rises again, the dog permits the carriage to move one step to the left where it is then retained by the pawl 133, the second row of settable pins being then positioned underneath the keys. Actuation of a numeral key at this time will depress and set a pin in the second row. As the carriage moves to the left, the flange 141 on the rack locking plate will be removed step by step from in front of each rack associated with any longitudinal row of stop pins in which one of the pins has been depressed; thus the subsequent rearward motion of the rack during the adding operation will be controlled by the depressed stop pin.

Whenever the carriage is returned to its normal righthand position either manually by means of the key 105 or automatically near the end of the return stroke by the action of the arm 118 shown in Fig. 6, any stop pins which have been depressed will be raised to their normal upper position as they engage the ramp 147 on the pin restoring plate 148.

Correction key

The key 105 provided for restoring the carriage manually serves as the correction key in the event any numbers have been set up incorrectly on the carriage and discovered before an adding operation begins.

Repeat key

Referring to Fig. 6, the repeat key 149 may be operated if desired, to cause the repetition of the adding of any combination of numbers set up in the keyboard, by pulling the key forwardly or to the right, as Fig. 6 is viewed, rotating it about the post 151 on which it is mounted on the side frame plate. A short post 152, carried on the lower extension of the repeat key, extends through a curved slot 152' in the oscillatable plate 153, the latter being pivoted on a post 154, whereby the rotation of the repeat key from the normal position shown in Fig. 6, will raise the forward end of the plate 153, causing the pin 155 to lift up the arm 118 and prevent the notch 122 from being engaged by the rotatable sleeve 156 mounted on the post 157 which is fixed on the cam plate 43. This latter post otherwise would pull the arm 118 rearwardly toward the end of the return stroke. When the repeat key is thus operated, the pin carriage will be left at the position to which it has been actuated by the numeral keys and the numbers set up therein can be printed and added to the accumulators as many times as desired.

To hold the repeat key either inoperative or operated, there is provided a locking plate 158, pivotally mounted on the post 154 and carrying a short post 159 positioned to engage the repeat key either above or below the shoulder 161. The spring 162 anchored on the post 163, mounted on the side frame plate, is connected to plate 158 to hold the key resiliently locked in either of its positions.

To hold the arm 118 downwardly, a spring 164 is connected to the rear end of the arm and anchored to a post 165, secured to the main side frame plate.

When the repeat key is inoperative and the post 156 has been moved clockwise during the forward stroke of the operating handle, the arm 118 is thus allowed to drop down where the hook 122 is engaged by the post 156 on the return stroke. As the arm is pulled rearwardly, it restores the pin carriage to the right and simultaneously the cam surface 166 on the arm engages a roller 167 carried on the post 168, the latter secured to the side frame plate, and gradually raises the arm for the purpose of disengaging it from the post 156 just before the completion of the return stroke.

Printing mechanism

For association with each longitudinal row of stop pins in the carriage is a slidable rack 169, one of which is best illustrated in Fig. 5. As is apparent from Fig. 11, in addition to one rack for each row of stop pins, there is provided one additional rack, which will be designated as 171, and whose purpose will be described later. All of the racks are slotted for slidably supporting them on the cross rods 172 and 173 carried by the intermediate frame plates 6 and 7. Each rack is normally urged rearwardly by its associated spring 174 anchored on the comb 175 through which the racks slide. The forward end portions of the racks are held vertically and properly spaced by the comb 176. Each rack is provided with a horizontal flange 177, the rearward margin of which flange may engage with either the rack retaining plate flange 141 or any of the 9 aligned stop pins for the printing of numerals zero to 8 inclusive. In the event 9 is to be printed, the rack flange will engage the lower extension 178 on the plate 93, which serves in place of a stop pin for the numeral 9.

The rear portion of each rack bar is equipped with six teeth 179 aligned to mesh with the teeth 181 on the type sector wheels 182 which are mounted to rotate freely on the shaft 183 journalled in the intermediate frame plates 6 and 7. Each type wheel carries a type plate such as 184, the plate being fixed in any suitable manner on the wheel and carrying printing type bearing the numerals zero to 9 inclusive.

Rotatably mounted on the shaft 183 adjoining each type wheel is an adding sector 185 having, in the illustrated embodiment, 11 teeth herein designated as 186. Each adding sector is operatively connected with its associated type wheel by means of a spring 187. The relative positions of the sector and type wheels shown in Fig. 5 are the positions which they occupy when the machine is blank or when no transfer is being effected through them from one numeral order to the next highest. When so positioned, the initial rearward movement of a rack bar does not move the adding sector initially but as soon as the ear 188 on the type wheel engages the shoulder 189 the adding sector will thereafter be positively rotated by the type wheel.

Rectifier

The upper portion of each type wheel is provided with a series of eleven teeth designated 191, which are used in connection with a rockable bail known as a rectifier bar to assure that at the time the platen roll contacts the type characters, the latter will be properly aligned for printing the figures in a straight row on the platen. By the same means proper alignment of the adding sectors is assured because of their connection with the type wheels. This rectifier bar 192 is formed as a flange on a bail 193 pivoted on the pins 194 and 195, positioned on the upper part of the intermediate frame plates.

Extending downwardly from the left arm of the rectifier bail is a leg 196, carrying a pin 197 extending through a slot in the intermediate side plate 6. The pin extends into an open-ended slot in a rectifier crank 198, mounted loosely on bearing 199 which supports the shaft 183. This crank carries a pin 201 and is normally held forwardly by a spring 202 anchored to the post 203, thus holding the rectifier bail normally in a raised position. A rectifier cam (Fig. 17) 204 is secured by a pair of posts 205 and 206 to the plate 43.

During the forward stroke of the operating handle, the shaft 18 rotates the rack cam or plate 43 forwardly, and hence rotates the rectifier cam 204 upwardly until its cam surface 207 lifts the pin 201 and holds it raised as the handle reaches its full forward position and rotates backwardly some distance. The lifting of pin 201 causes the rectifier bar to swing downwardly between the rectifier teeth on the type wheel, thereby aligning all of the type wheels, and at the same time properly aligning the adding sectors prior to their engagement with the accumulators, if the operation be an ordinary adding operation.

Accumulator swinging frame

The machine illustrated employs a swinging frame on which the accumulator gears are carried. The pivotal axis for this frame is the rod 208 carried between the intermediate frame plates. On this rod is fixed a pair of arms 209 and 211 which support a non-rotatable shaft on which the accumulator wheels 212 are rotatably mounted. This entire frame, which normally occupies a downward position, is adapted to swing upwardly to bring the teeth of the accumulator gears into contact with the teeth on the adding sectors at the beginning of the return stroke of the operating handle during an adding operation. Consequently, the amounts set up by the keys will be added to the accumulators as the adding sectors return to normal position. However, when a total is being taken the swinging frame is lifted on the forward stroke of the handle, immediately engaging the accumulator wheels with the adding sectors, each accumulator wheel being returned to zero by its associated adding sector. If the operation be a final total operation, the accumulators are left in zero, being disengaged at the end of the forward stroke; but if it be a sub-total operation they remain in engagement and during the return stroke their respectively associated adding sectors restore to them the sums previously accumulated.

The actuation of the accumulator swinging frame, which is shown in detail in Figs. 15 and 16 will be described later.

Keyboard locking mechanism

After one or more keys have been actuated in the keyboard to set up a sum which is desired to be added to the accumulators, it is then necessary in performing the adding operation that no other keys may be actuated inadvertently during the stroke of the operating handle. For this purpose, I provide an arm 213 (Fig. 6), fixed on the shaft 214, the latter being journalled in the longitudinal side plates 87 and 88 of the removable keyboard unit (Fig. 10). On the opposite end of this shaft there is fixed an arm 215, which extends forwardly underneath the righthand extremity 216 of the escapement bail arm 125. A post 217 extends to the right on the cam plate 43 in such a position that as soon as the operating shaft 18 begins to move the post will be brought into contact with the under edge of the arm 213 and will rotate the arm 213 to the position shown in Fig. 6, at which time the arm 215, moving integrally therewith will engage the arm of the escapement bail and prevent any key from thereafter being depressed so long as the post 217 is contacting the arm 213 during the forward and return strokes of the handle. The curved edge of the arm permits the post to move in an arcuate path in contact with the arm. It will be understood that the arm 213 is otherwise free to rotate downwardly a slight amount from the position shown in Fig. 6 to permit the free operation of the escapement bail when numeral key actuation is desirable.

The keyboard is again locked during total-taking operations by a different mechanism which will be explained in connection with the description of the total key operation.

Total key lock

Figure 3:
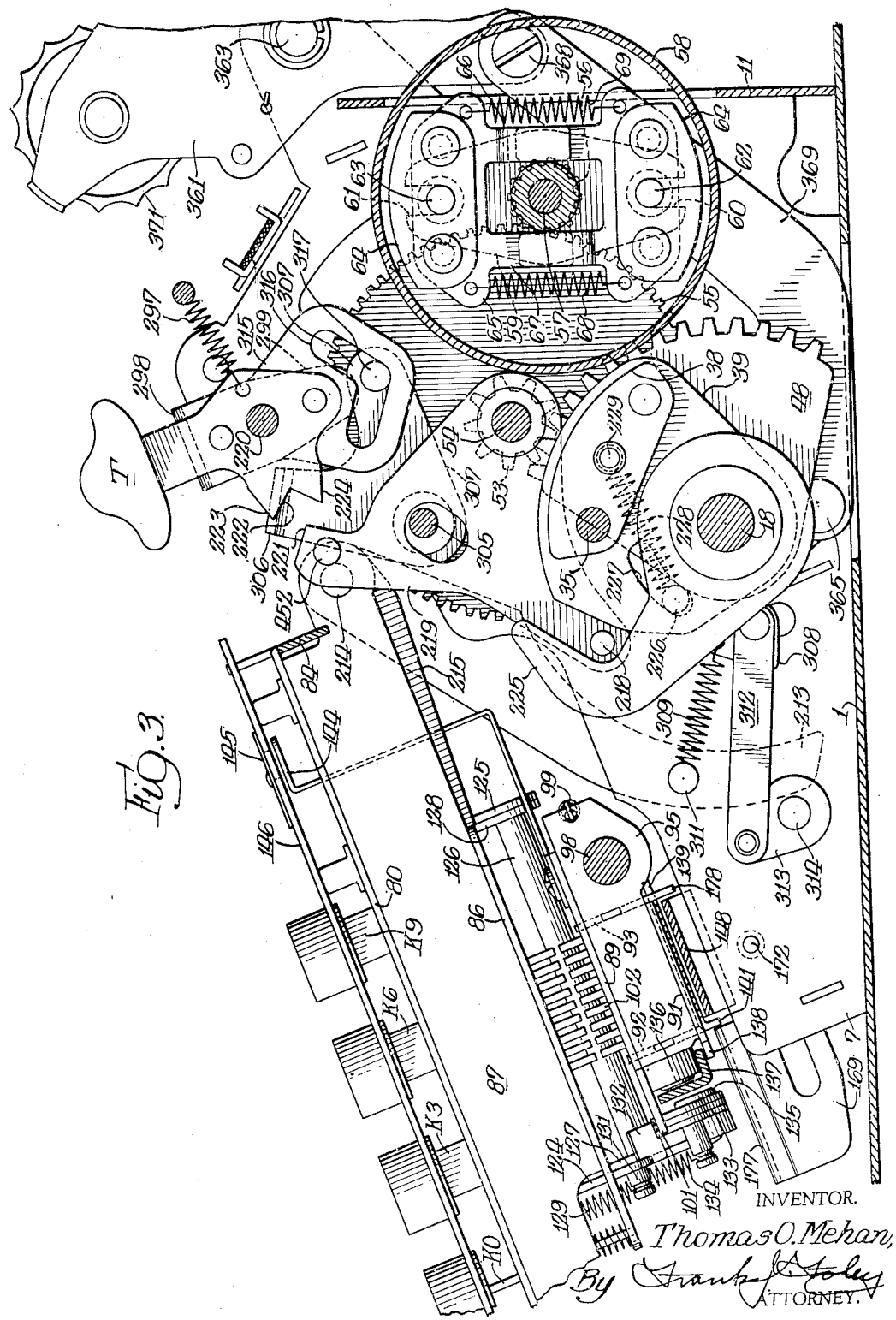
Fig. 3 is a longitudinal vertical section view of the machine in a plane just inside the right hand vertical frame plate, on line 3—3 of Fig. 7.

When the operating handle begins its forward stroke, the cam 39 (Fig. 3) will shortly strike pin 218 mounted on the total key locking plate 219 and cause lock pawl 221 formed on the upper end of this plate to engage and lock the total key. If the key be in normal position during an adding or idle operation the pawl 221 enters notch 222 of the key. If the key has been rotated about the post 220 forwardly for taking a final total as in Fig. 18, the pawl engages the key above the projection 223 overlying the notch 222. When the key is in sub-total position, as in Fig. 19, the pawl engages the key below the projection 224 underlying the notch 222. Any of these three engagements will lock the total key and hold it locked till the conclusion of the return stroke. As the cam 39 strikes pin 218, the hook 225 becomes disengaged from the pin 218, thus allowing the key lock to move into locking position. The hook 225 is rotatably mounted on the bushing 20 surrounding the shaft 18 and carries a post 226 which extends through a slot 227 provided in the total key lock cam 39 (Fig. 3). A spring 228 anchored to a post 229 carried on the key lock cam and connected with the post 226 on the total key lock hook normally urges the latter to rotate rearwardly, while the end of the slot 227 acting on post 226 near the end of the return stroke positively pushes hook 225 rearwardly and thus positively returns the key lock to normal.

Carrier restore action

At the beginning of the forward stroke of the operating handle and prior to the rotation of any of the type wheels, the carrier restore plate 231 fixed on a rotatable rod 232 journalled in the intermediate frame plates, is caused to rotate downwardly and strike the shoulders 233 on all of the adding sectors, disengaging from the notches 234 of the carrier pawls 235 the laterally extending ears 236 of any adding sectors which at that moment happen to be within the notches. Carrier pawls thus disengaged from the notches will drop down and the disengaged ears 236 will then rest against the pawl ends as shown in Fig. 5.

The downward rotation of the carrier restore bar 231 is effected as follows: The control pawl arm or plate 42 (Fig. 7 and Fig. 4), which is mounted to rotate with the main operating shaft, carries a post 237 on its left side which contacts, at the position shown in Fig. 4, the carrier restore pawl 238 pivoted on the pin 239 carried by the plate 241 which is non-rotatably secured on the end of the shaft 232. Connected with the pawl is the spring 242, the other end of which is connected to a post 243 carried by the plate 241. As the operating shaft continues to rotate further forwardly, the post 237 pushes against the notch 244 in the carrier restore pawl and for a short time exerts a thrust against the pivotal point of the pawl, causing the plate 241 to rotate in a clockwise direction, as seen in Fig. 4, thereby swinging the carrier restore bar downwardly against the adding sector shoulders. As the post 237 is further advanced it will finally rotate the pawl downwardly and escape from the notch in the pawl, thus permitting the carrier restore bar to return upwardly to its normal position. On the return stroke of the handle the post will ride underneath the pawl 238 inasmuch as the latter is free to swing upwardly.

Rack restore mechanism

As the operating handle advances on its forward stroke, the rack cam arm or plate 43 is rotated upwardly and forwardly. The post 245, mounted on the plate, slides upwardly along the cam surface 246 into the notch 247 of the rack cam 248 and causes the cam to oscillate forwardly. Prior to the forward movement of this cam, all of the type wheels remain stationary, being so held by a bail including a rod 249, which at the time extends across the bottom of the slot 250 of each type wheel (Fig. 5). However, as the main operating shaft rotates further, the post 245 on the rack cam arm moves forwardly and rotates the rack cam forwardly.

Mounted on the left end of the shaft 251 and arranged to move bodily with the rack cam 248 is a rack cam gear 252 in the form of a sector gear whose teeth mesh with the teeth of a rack restore sector gear 253, the latter being fixed on the shaft 183. In addition to rotating the shaft 183, the cam restore gear forms a bail with the bail rod 249 and the arm 254 (Figs. 4 and 6). Hence, in an adding operation, the forward rotation of the bail rod permits the rotation of the type wheels to the extent permitted by their associated racks. As the operating handle moves to the full forward position, the cam follower post 245 rides down the cam surface 255 of the rack cam, while the parts operated by this movement of the rack cam complete their full movement on the forward stroke.

During the return stroke of the handle the rack cam arm 43, the rack cam 248, and the rack restore gear function to return the bail 249 to its starting position, the bail thereby restoring all type wheels and their associated racks to starting position, against the action of the rack springs 174.

Accumulator selector mechanism

Referring now to the functions of the control pawl arm plate 42 during the forward stroke of the handle, it has been previously described how the initial forward rotation of this plate actuates the carrier restore plate 231 to strike the adding sectors. As the control pawl arm 42 is completing its forward motion, the accumulator control pawl 256, which is pivotally carried on the control pawl arm, passes underneath a pin 257, fixed on the right side of the accumulator selector plate 258, which is pivoted at 259 on the intermediate frame or accumulator frame plate 7. As the return stroke of the handle begins, the left hand notch 261 in this pawl will engage the post 257, and as it passes underneath the same, swinging about its pivot 262, the pawl will rock the accumulator selector plate in a clockwise direction.

The clockwise rocking of the selector plate 258 at this time raises the accumulator swinging frame to engage the accumulator gear teeth with the adding sector teeth. The action is secured as follows. An accumulator selector 263 is pivotally connected with the arm 211 of the swinging frame by means of a post 264. The upper portion of the selector 263 is provided with two oppositely opening slots 265 and 266. Normally, when the machine is at rest, and also during the forward stroke of the handle in a normal adding operation, a post 267 fixed on the left side of the accumulator selector plate 258 lies in the slot 265. Hence, when the plate 258 is rocked clockwise, as just above described, the selector is necessarily lifted, thus lifting the accumulator swinging frame to engage the accumulator gears with the adding sector gears during the return stroke of the handle.

By means of a locking mechanism, the accumulator gears are held engaged with the adding sectors during the entire return stroke, that is, until all adding sectors have been restored by the bail 249. This mechanism consists of an accumulator frame locking arm 268, rotatably mounted on shaft 183, and provided with two notches 269 and 271 (Fig. 4), the lower notch engaging the post 272 when the accumulator gears are lowered, while the upper notch 269 engages the post and holds the accumulator gears engaged with the adding sectors when the accumulator frame has been raised. This post extends through a slot in the intermediate frame and is secured to the arm 211 of the swinging frame. The accumulator frame lock is in the form of a bell crank which has another arm 273 to which is connected a spring 274 anchored on the stationary post 275, this spring thereby holding one notch or the other resiliently in contact with post 272. At the lower end of the arm 273 is a cam follower 276 which will be engaged by the cam 277 riveted on the left side of the control pawl arm plate 42. This cam is so shaped and has such length that it will prevent the accumulator lock arm or pawl 268 from being disengaged from the post 272 during any of the following periods. In an ordinary adding operation during the forward stroke the cam acting on the follower 276, will make certain that the accumulators remain out of engagement with the adding sectors, but when they have been lifted into engagement at the beginning of the return stroke, the cam will make certain that the accumulators remain engaged with the adding sectors until the return stroke is completed. Also during a total operation, when the accumulators are lifted into engagement with the adding sectors on the forward stroke, continued engagement will thereby be assured until the forward stroke is completed, and as the return stroke begins and the accumulators are disengaged they will be held disengaged by this cam to the end of the return stroke. During a sub-total operation the cam aids in holding the accumulators engaged during the forward and the return strokes.

However, it should be here noted that, while the cam 277 holds the accumulator locking pawl immovable during the return stroke in a normal adding operation, just as the return stroke is being completed, the cam follower 276 leaves the cam and the lower end of the cam directly strikes the post 264 carried by the swinging frame and pushes it downwardly, thereby disengaging the accumulators, the locking pawl yielding against the action of its spring.

Accumulators

The accumulators 212 which are mounted on the shaft 288, are each provided with ten teeth designed to mesh with the teeth of the adding sectors, and at the left of the teeth of each accumulator is a negative cam 289 concentric with the axis of the accumulator wheel and having a uniform diameter, except for a recess located at the numeral one position on the accumulator.

Further to the left (Fig. 7) of this cam is a positive cam 291, likewise concentrically mounted and having a uniform diameter except for a raised tooth 292, this tooth being located at a zero position.

During a normal adding operation, when any of these accumulator wheels have been raised into mesh with its associated adding sector, the return movement of the adding sector will cause the accumulator wheel to rotate in a counterclockwise direction, as viewed in Fig. 5. Each adding sector will previously have been rotated on the forward stroke of the machine to the extent determined by the associated stop pin in the carriage. Consequently, on the return stroke, each accumulator wheel will be rotated to the same extent as its associated adding sector moves in returning to normal. If any of the accumulator wheels have been previously rotated away from zero and in this operation under consideration reaches or passes its zero position, the tooth or raised projection 292 will lift the carrier pawl in registration with that cam. When the restoring bail 249 is returning the type wheels and their associated adding sectors to zero during the return stroke of the handle, as each type wheel comes to rest each adding sector will stop either with its ear 236 resting against the end of a carrier pawl as shown in Fig. 5, or if the accumulator wheel to the right had reached or passed zero during the adding operation, the adding sector ear 236 will be drawn by the spring 187 into the notch in the carrier pawl.

It should be explained that during the rotation of the accumulator wheels, when any carrier pawl is lifted by any of the projections 292, the upper notch in the carrier lock pawl 293 engages the shoulder 294 of the carrier pawl and holds it in raised position so that the associated adding sector in the next bank to the left may be able to rotate to the extent of one additional tooth before the accumulator wheels are dropped out of engagement with the adding sectors.

As the accumulator frame drops down at the end of the return stroke, the comb 295 which lies astride the lock pawls associated with the carrier pawls will drop down and rotate each of these lock pawls counterclockwise. Hence, when the carrier restore bar or carrier restore plate 231 goes into action at the beginning of the next forward stroke to withdraw the ears 236 from the carrier pawl notches any carrier pawl which was previously in raised position may now drop down into contact with the lower notch on its associated lock pawl. As shown in Fig. 5, each lock pawl is held under tension by a spring 296 connected to its associated carrier pawl.

Total key operation

When the total key is rotated forwardly about its axis 220 (Figs. 7, 18, 3) against the action of its spring 297, the yoke 298 to which it is rigidly secured is similarly rotated. To the inner leg 299 of the yoke is fixed a rod 301 which engages the slot 302 in the signal type sector wheel 303 to rotate this wheel in a clockwise direction to present the letter "T" to the printing plane for printing along with the total (Fig. 21).

The forward rotation of the total key also operates the total control lever 304. This control lever, whose outline is shown in Figs. 4 and 18 is pivoted in line with post 305 fixed on the outer frame, its upper end 306 being bent over to form a part of a bail with the arm 307, which arm pivots on post 305. A lower leg 308 on the control lever is connected to a spring 309 anchored on the post 311 on the intermediate frame. At the lower extremity of this leg is a link 312 pivotally connected with an arm 313 fixed on a rock shaft 314 extending across the intermediate frame.

Referring again to Fig. 7, the total key stem is fixed upon the outer leg 315 of the yoke 298, and this leg is provided with a V-shaped elongated slot 316 (see Fig. 3). Forward rotation of the total key causes the post 317 fixed on the control lever bail arm 307 to ride up in the forward end of slot 316, lifting the arm, and thereby rocking the entire control lever forwardly about its axis 305. This motion is then transmitted to the rock shaft 314 by link 312, and the ensuing clockwise rotation of the rock shaft raises the lock plate 318 fixed on the shaft.

If the pin carriage is at the extreme right side of the machine, as it should be when the total key is operated, the plate 318 will rise to the left of the bottom projection 178 on plate 93 of the pin carriage to prevent the carriage from being thereafter stepped toward the left, thereby preventing any of the numeral keys from being effectively operated. At the same time, as the plate 318 rises it will raise a plate 319 which is rotatably mounted on the rock shaft and connected to plate 318 by spring 321 anchored on posts 322 and 323, which are fixed on plate 318 and 319 respectively. The raising of plate 319 lifts the rack locking flange 141 (Figs. 4 and 6) to enable all of the racks to move rearwardly during the totalizing operation. Post 324 mounted on the side of the plate 319 will be struck by plate 318 to positively lower the former when the total key is restored to normal.

If the pin carriage is not at the extreme right when the total key is actuated, as would be the case if one or more numeral keys had been depressed and the machine not cleared by an adding or correcting operation, the plate projection 178 (Fig. 6) will be in a position so far to the left as to prevent the plate 318 from rising, which will prevent the total key from being effectively operated. Therefore, the pin carriage must first be restored to the right.

Another function of the total control lever is for that lever to act through the link 325 pivotally connected with the accumulator selector 263 to rotate that member in a clockwise direction whereby the right-hand notch, as viewed in Fig. 18, in the accumulator selector will engage the post 326 which is carried on the inner face of the accumulator selector plate. The engagement of this notch with the post rotates the accumulator selector plate slightly in a clockwise direction and brings the post 327 somewhat closer to the path of travel of the accumulator control pawl 256. Hence, at the beginning of the forward stroke of the handle, the right-hand notch 328 in this pawl will engage the post 327 and raise it and because of the fact that the accumulator selector is hooked over the post 326 the accumulator selector frame will thereby be lifted and its accumulator wheels will be engaged with the adding sectors.

Zero eliminators

A further function of the rotation of the total control lever is noted in its action on the zero eliminators. Referring to Figs. 19 and 26, the rear leg 329 of this control lever has a slot 331 embracing a post 332 secured to the right-hand plate 333 of the zero eliminator frame, hence, whenever the lever is rocked in taking a subtotal or total, the slot 331 will rock the frame from the position shown in Fig. 26 to that shown in Fig. 19. The zero eliminator frame consists of two plates 333 and 334, which are rotatably mounted on a rod 335, which is fixed in the intermediate frame plates. The plates 333 and 334 carry between them two combs 336 and 337, each provided with vertical slots through which the individual zero eliminators extend, each eliminator being rotatably mounted on the rod 335.

There will be one zero eliminator for every type wheel except the first two type wheels at the right. These two will preferably print zeros in any total operation whenever their accumulators contain no accumulated sums. Each eliminator is provided with an offset ear 338, which extends under the next eliminator to the right. The spring 339 as shown is connected with a plate 341, which extends between the side frame plates of the eliminator. The upper portion of each eliminator is provided with a rearwardly extending shoulder 342 which (Fig. 5) extends through a comb 343 which serves as an additional guide for maintaining the eliminator properly aligned. The upper end of each eliminator is provided with a hook 344, which may engage with an ear 345, extending to the left from the left side of each type wheel to hold the same in normal inoperative non-printing position.

The lower end of each eliminator is shaped to form a pawl 346 which is so positioned as to ride on the zero eliminator cam 289 of an accumulator. During normal addition operations the eliminators are wholly inoperative. When a total or sub-total is being taken the rotation of the total key for either operation rocks the zero eliminator frame into operative position and each pawl 346 will then contact its associated accumulator cam 289. If any accumulator is in zero position the associated pawl 346 will enter the recess therein and the hook 344 at the upper end of that eliminator will engage the ear 345 on the associated type wheel. If this engagement is permitted to continue during the total taking the type wheel which is thereby held will remain in non-printing position. However, the eliminator is not permitted to hold the type wheel in non-printing position unless there are no accumulators to the left thereof which contain at the time of the total taking operation a sum above zero. If there be any such, the eliminator associated with the accumulator farthest to the left which has a sum above zero will be held in a retracted position, inasmuch as the nose of the pawl 346 will be riding on the major diameter of the cam 289. When the eliminator is thus held in retracted position the hook 344 on its upper end cannot engage the ear 345 on the associated type wheel hence if the total operation continues that type wheel may be rotated to whatever position is determined by the sum accumulated in the associated accumulator.

Whenever any eliminator is thus held in retracted position by its accumulator cam being in a non-zero position every eliminator to the right thereof will be retracted also for the reason that the offset ear 338 on the first cam retracted eliminator will lift and retract the next eliminator to the right and in like manner every eliminator to the right thereof will be lifted regardless of the position of its accumulator cam 289. The purpose of this is to enable zeros to be printed in such totals as 2,000, 20,000, 200,000, and so forth.

It will now be understood that if the total is a sum in the hundreds no zeros to the left of the hundreds will be printed. Likewise, if the total is in thousands no zeros to the left of the thousands will be printed, for the reason that the cams 289 in such banks to the left will permit their eliminators to engage the ears 345 of the associated printing wheels and hold them in non-printing position. Hence, if the total to be printed should happen to be 20,075, the machine is prevented from printing any such figure as 020,075.

Assuming that a total of 60,555 is to be printed by the machine illustrated in the drawings, the printings of the zero in this sum is effected as follows:

The eliminator for the bank in which the zero should be printed has been retracted by means of the offset ear 338 on the eliminator next to the left, consequently that type wheel will not be held by the eliminator against rotation. But when the accumulator which is in zero position is raised into contact with its adding sector it is locked against rotation by the engagement of its carrier pawl with the projection 292 on the tens transfer cam 291 on the accumulator, consequently the adding sector cannot rotate. But the rack associated with this type wheel, being normally urged rearwardly by its spring 174 will nevertheless rotate the type wheel as soon as the restoring bail 249 rotates away from the bottom of the slot 250 in that type wheel. The type wheel however, can be rotated by the rack only until the ear 188 strikes the shoulder 189 on the adding sector which is being held stationary by the accumulator. This amount of rotation is sufficient to bring the zero type up into printing position.

It will now be understood how zeros may be printed in every bank to the right of the first bank counting from the left, which through prior adding operations, is in condition to print a sum above zero. Those type wheels which should print zeros and which are equipped with eliminators will have their eliminators retracted as above described. The two type wheels farthest to the right which have no eliminators associated with them will print zeros if they contain no sums inasmuch as the accumulators will rock the associated adding sectors but the slight amount of movement provided between the type wheel and the adding sector permits the associated racks to rotate the type wheels to zero printing position.

During the total-taking operation, any accumulator gear which through prior adding operations had been rotated beyond zero will be rotated back to zero by its adding sector and will stop at zero when its carrier pawl engages the projection 292 on the carrier or tens transfer cam of the accumulator.

It may be here noted that any time the accumulator frame is lowered to its normal inoperative position, the teeth of the accumulators will be engaged by the teeth 347 on the comb 348, which is fixed in the accumulator side frame plates, and thus these accumulators are prevented from inadvertently rotating.

*Sub-total operation*

When the total key is operated to sub-total position, as shown in Fig. 19, the rod 301 connected with the left-hand leg of the yoke 298, will rotate the signal type wheel so that it will print the signal ST. The V-shaped slot 316 of the yoke 298 will lift post 317 on arm 307 of the control lever bail to thereby rock the shaft 314, as heretofore described, to lock the keyboard against actuation during the sub-total operation. The right-hand notch of the accumulator selector will engage the post 326, just as in the total taking operation, whereby immediately upon the beginning of the forward stroke of the handle, the accumulator frame will be lifted by the accumulator control pawl 256. However, as contrasted to the total operation, when the return stroke is begun, the accumulator control pawl will not be able to lift on the post 257 and cause the accumulator frame to drop down. This is because in a sub-total operation the post 301 carried on the left leg of the bail 298 will ride down the slot 349 in the bell crank lever 351 and rock the same in a counter clockwise direction, whereby the lower extremity 352 of this lever will be struck by the post 353 of the accumulator control pawl, thereby preventing the pawl from rising to such a position that on the beginning of the return stroke its left-hand notch could engage and raise the post 257 to cause the accumulator frame to drop down. As a consequence thereof, the accumulator gears and adding sectors will remain in mesh, not only during the forward stroke but the return stroke also, and while the sub-total sum will be printed, the accumulators will not lose the totals which they have up to that time accumulated.

Having in mind the foregoing description of the functioning of the carrier pawls and adding sectors, it will be perceived that after any adding operation, prior to the lowering of the accumulator wheels against the fixed teeth which hold them locked, all tens transfer operations are completed and no idle operation of the handle is required prior to the taking of either a sub-total or total. It will be recalled that at the beginning of each forward stroke, whether it be in another adding operation or in a total taking operation, the carrier restorer plate will be operated to restore all adding sectors to normal position before they may again be contacted by the accumulator gears.

Platen mechanism

The platen mechanism provided in the illustrated embodiment is of the rockable type. The two platen frame side members 361 and 362 are mounted for oscillation upon a shaft 363, the latter being supported on the intermediate frame plates 6 and 7. For rocking the platen frame there are provided a link 364 pivotally connected at 365 to the plate 42 fixed on the main operating shaft and another link 366 pivotally connected by the pin 367 to the plate 43, which is likewise fixed on the main operating shaft, as shown in Figs. 3 and 6. These links are pivotally connected to the lower ends of the platen frame by pivot pins 368 and 369. Each time the operating shaft rocks, the platen frame will also be rocked by links 364 and 366.

At the upper ends of the platen frame members a platen roll 370 is rotatably supported. At the right end of the platen roll and fixed on the shaft thereof is a knurled knob 371 for the manual rotation of the roll. On the other end of the platen roll shaft is fixed a ratchet wheel 372. A pawl 373 is pivotally supported at 374 on the intermediate frame and is normally urged upwardly by means of a spring 375 connected to the forward-most end of the pawl and anchored on the intermediate frame. When the machine is at rest the pawl is normally out of engagement with the ratchet wheel, being held clear by the spacing rod 376 which connects the two platen frame members. After the platen roller has been rocked forwardly into contact with the type wheels the position of the parts is then such that the tooth 377 on the pawl is in contact with the ratchet wheel and as the platen frame rocks rearwardly again, the ratchet wheel will be rotated to the extent of one tooth to thereby feed the paper around the platen. A spring loaded locking pawl 378 to which is connected spring 379 is provided with a roller 380 which engages with the ratchet teeth and holds the platen roller resiliently locked when it is not being rotated either manually or by means of the pawl 373. The pawl 378 is provided with a notch at its lower end which embraces the post 381 mounted on the inside of the platen frame plate 362, thus furnishing a pivot for the pawl.

For supplying paper to the platen roller I provide a roll of paper 382, which may be mounted as shown in the drawings or in any other suitable manner. The details of construction of the paper roll support and the platen mechanism do not form a part of the present invention, therefore, any suitable method of conducting the paper from the paper roll to the platen roller may be employed. It is sufficient to state that in the operation of the machine the platen roller is rocked downwardly on the forward stroke of the handle and pressed against the type characters with sufficient force to impart the desired impression on the paper carried by the platen roller.

Any suitable ribbon feeding mechanism may be employed of a character which will automatically feed the ribbon across the printing plane where the type characters meet the platen roller.

Full keyboard mechanism

As pointed out heretofore, the adding and printing mechanisms are so designed that they may be used interchangeably with either a full keyboard or 10 keyboard control. Only a slight modification in the repeat and total key structures is required for adjusting the machine to either of the two controls. In either case the keyboard mechanisms are removable as compact assemblies, and because of their different principles of operation, the operative connections between the racks and the keyboards require some changes in the racks to suit them to one or the other type of keyboard.

A comparison of Figures 25 to 31 inclusive with the preceding figures will serve to illustrate these various changes and the construction of the full keyboard unit itself.

Fig. 30 shows that the illustrated embodiment is provided with 5 banks of numeral keys generally indicated as 401. Each bank contains 9 keys numbering 1 to 9 inclusive, there being a provision for the automatic printing of zeros when required without actuation of the numeral keys. Because of the spacing required between banks, the key stems of adjoining banks are more widely spaced than are the racks. Hence, as indicated in Fig. 30, each rack associated with a bank has secured thereto an extension or slide, the latter being so formed as to move longitudinally beneath the several banks. The racks 402 are, therefore, spaced the same distance apart as in the 10-key modification of the machine, that is at the same distance apart as are the adding sectors and the type wheels. Brackets 403 of the necessary configuration rigidly secure the rack slides 404 to the racks. Springs 405 connected as shown in Fig. 31 serve normally to urge the racks and rack slides rearwardly whenever released for such movement. The rack slides are identical in shape and are provided with projections numbered in Fig. 31 as S1 to S9 inclusive, the racks in their rearward movement being stopped by the engagement of these projections with key stems of the correspondingly numbered keys.

The racks themselves are guided in combs and upon cross rods just as are the racks shown in Fig. 5 of the 10-key modification. The rack slides are guided in combs 406 and 406' mounted on channelled cross braces 407 and 408 (Fig. 31).

The key stems 409 are formed as shown in Fig. 26 and are held normally in raised position by springs 411 which pass through suitable holes in the key stems and over suitable notches in the longitudinal keyboard frame plates 412, these plates being secured to the top and bottom plates 413 of the keyboard unit by swaged connections. The opposite ends of each transverse key stem spring are looped around the longitudinally extending wires or rods 414. The stems extend through narrow slots in the top and bottom plates of the keyboard and are guided on cross rods 415. The key stems also extend through slotted plates 416 and 417, the former being a slide key lock, one for all of the keys in each bank, and the latter being a rack lock slide. Both of these slide plates are guided on posts 418 which are riveted to the bottom keyboard plate, suitable washers 419 and 421 being provided as shown to separate the slides from each other and from the bottom plate of the keyboard. A post 422' under each bank is secured rigidly to the keyboard frame and a spring 423 anchored thereon is connected with a projection 424 on each key lock to urge the same rearwardly in the keyboard.

A rear transverse frame plate 425 and an identical plate 426 at the front end of the keyboard unit both rigidly secured to the top and bottom plates and longitudinal plates in the keyboard unit complete the rigid frame of that unit. These front and rear plates are slotted as shown to permit the lock slides 416 and 417 to project therethrough.

Upon the actuation of any key the shoulder 427 on the key stem will push the key lock 416 forwardly and become engaged underneath the lock. Subsequent depression of any other key in the same bank will first release the previously depressed key and lock the second, as will be readily understood by those familiar with this art. At the same time the shoulder 427 will push the lower slide, which may be called the rack lock, forwardly, which causes the rack lock to project beyond its normal position through the front end of the keyboard unit to lift the rack pawl in the same bank, the zero pawl in the same bank, and all rack pawls in the banks to the right thereof.

The rack pawls and zero pawls are best shown in Fig. 31. Each rack slide 404 is provided with a projection 428 which normally is engaged by the rack or latch pawl 429. This pawl is formed as part of a bail pivotally mounted on the cross rod 431, as seen in Fig. 31. The right end of this bail is fashioned into an ear 432 which extends underneath the rack pawl to the right thereof. Adjoining each rack pawl and operative upon the same rack slide is a zero pawl 433, fashioned in the form of a bail and pivoted on the same cross rod. An upwardly extending projection 434 on each zero pawl is in position to engage the front end of each rack lock slide 417. A spring 435 connected as shown (Fig. 32) lifts the forward end of the zero pawl bail and presses the projection 434 against the associated rack lock slide.

The zero pawl bail extends underneath the ear 432 on the latch pawl bail. Consequently, when a key stem is depressed and locked the rack lock slide being thrust forwardly, rotates the zero pawl bail to cause it to lift the zero pawl out of position where it might engage the projection 428 on the rack slide in that bank, and at the same time lifts the ear 432 of the rack pawl in the same bank, thereby lifting the rack pawl so that it also may not engage the rack slide. Thus during the subsequent adding and printing operation the rack slide may move rearwardly until the proximate projection S1 to S9 inclusive encounters the key stem which has been depressed and locked down.

As the rack and zero pawls are lifted in that bank it will be noted that the ear 432 will raise the rack pawls 429 to the right thereof, if this had not previously been raised, but will not raise the zero pawls in the banks to the right thereof. Consequently if no keys are depressed in the banks to the right of the first mentioned key, while all the rack pawls have been lifted the zero pawls will remain in lowered position ready to stop the rack slides at the zero printing position, that is, permitting the printing wheels to rotate far enough to bring the zero up to the printing plane.

*Full keyboard key release*

The release of the key lock slides in the keyboard to release all depressed keys is effected in two ways. First, it is done automatically at the conclusion of each normal adding operation, unless the repeat key has been operated to prevent this, and secondly, at the beginning of any total or sub-total operation. In the latter case the total key itself is employed to release the keyboard lock slides. Referring now to Fig. 27, it will be observed that there is provided an unlocking device for the key lock slides in the form of a bail including a cross bar 436, the arms of the bail being pivoted on the opposite main frame plates at 437. The righthand arm serves no function other than a pivotal support but the lefthand arm 438 carries a pivot pin 439 upon which is pivoted a dog 441, the upper end of the dog having an ear 442 which normally rests on the top edge of the bail arm and is held thereagainst by the spring 443 connected to the dog and to a pin 444 on the bail arm. The cam plate 43' carries a post 445 which is free to pass under the resiliently pivoted dog 441 during the forward stroke of the main separating shaft 18, but which will strike the dog just before the finish of the return stroke, thereby causing the bail to be rocked in a clockwise direction, as Fig. 27 is viewed, whereby the bar 436 will strike the protruding ends of all key lock slides 416 and push them forward far enough to release all keys. At the end of the return stroke the above referred to parts resume the position shown in Fig. 27.

*Full keyboard repeat key*

The repeat key, shown in Fig. 27, is constructed the same as the repeat key employed in the 10-key machine, but operates, naturally, somewhat differently. When pulled forwardly the downwardly extending leg on the repeat key strikes the ear 442 on the dog 441 and rotates the dog far enough so that it will not be struck by the post 445 during either the forward or return stroke of the machine. Hence, the key release bar will not be actuated.

Referring now to Fig. 32, it will be observed that the rear end of each key lock slide is provided with an ear 446 projecting to the right, and on reference to Fig. 33 there will be observed a bail having a cross bar 447, the bar having downward projections which are properly spaced to engage in front of the ears 446 when the bar is lowered. The bar is pivoted on the same pivot posts as the repeat and total keys and is normally urged downwardly by a spring 448 attached to the bail arm 449 and to the post 451. The bottom edge of this bail arm is thus held against a post 452 extending from the side of the total key lock plate 219. Hence, during the forward stroke of the handle as the key lock plate rotates, the post 452 will slide up into the notch 453, allowing the spring to pull the bar downwardly, thus all the key lock slides are held against movement and no key may be accidently depressed during an adding operation.

When the total key is rotated either for a total or sub-total operation, as shown in Figs. 18 and 19, a projection 454 formed integrally with the total control lever bail will swing forwardly and rotate downwardly the bar 436, to thereby immediately release any keys which are depressed in the keyboard. As shown in Figs. 18 and 19, a spring 455 connected with this bar and anchored at any suitable place on the machine tends normally to hold this key release bar in raised position. It should be stated here, however, that the parts 436, 454 and 455 shown in Figs. 18 and 19 are employed only in the full keyboard machine, and not in the 10 key machine, although everything else shown in these two figures is utilized in either machine.

Operation of full keyboard machine

It has just been explained how the repeat and total keys coact with the full keyboard unit and how the keyboard unit itself functions to control the operation of the racks. The adding, printing, and total control mechanisms, obviously, operate in the same way with either the 10-key or full keyboards and as these latter operations have been described heretofore they need not now be repeated.

The advantages from a production standpoint of the adaptability of this machine to either keyboard control unit will now be so apparent as to require no argument. The economies gained thereby redound to the benefit of those who require or prefer either style of machine.

Casing

As will be apparent upon viewing Figs. 1, 2 and 33, and further confirmed by reference to the above mentioned co-pending application, Serial No. 282,787, the same casing may be used on this machine with either keyboard unit. When the 10-key unit is employed, the cover plate 146, as shown in Fig. 2, will mask the space around the keys within the rectangular opening in the main casing. When the full key unit is employed, a cover plate 146' likewise setting within the rectangular opening in the casing will mask the space surrounding the keys.

This application is a division and continuation of my application Serial No. 313,896, filed January 15, 1940, for patent on "Calculating machines," which has been abandoned.

While I have shown and described herein preferred forms of the various mechanisms especially adapted for either ten key or full keyboard control and have described these constructions in considerable detail, it should be understood that the invention as subsequently claimed herein may comprise numerous variations and modifications without departing from the spirit and scope of the claims.

Having shown and described my invention, I claim:

1. In a calculating machine having a main operating shaft and a ten-key keyboard unit including a transversely movable settable pin carriage, a pivoted crank connected with the carriage for restoring the carriage toward the right to normal position, an arm connected with said crank extending rearwardly in the machine and having a hook formed in its lower edge, a plate fixed on said shaft and a roller mounted on said plate engageable by said hook during the return stroke of the shaft to thereby rotate the crank to restore the carriage to normal position, the rearmost portion of the arm rearwardly of said hook being adapted to ride on said roller during pin setting travel of the carriage, a post stationarily mounted on the machine positioned to engage said arm to hold said notched portion of the arm in an inoperative position whenever the carriage remains in normal position during non-adding operations of the machine, the under side of said arm being so shaped that it engages with said post during return of the carriage in adding operations of the machine at the extreme conclusion of a return stroke to disengage the hook from said roller.

2. In a calculating machine, a keyboard, a settable pin carriage, means to cause the carriage to step to the left with each actuation of a numeral key of the keyboard, a pivoted crank device connected with the carriage for restoring the carriage to the right, said crank device having a first part located directly beneath the keyboard, said crank device having an arm rigid therewith, a main operating shaft, means actuated by said shaft and cooperating with said arm to restore the carriage to the right at the conclusion of the return stroke of said shaft, and a correction key and stem mounted for sliding movement over the face of the keyboard, the correction key stem having a portion engageable with said first part of the crank device for restoring the carriage.

THOMAS O. MEHAN.

REFERENCES CITED

The following references are of record in the file of this patent:

UNITED STATES PATENTS

| Number | Name | Date |
|---|---|---|
| 923,269 | Johantgen | June 1, 1909 |
| 1,866,023 | Friden | July 5, 1932 |
| 1,899,444 | Mehan | Feb. 28, 1933 |
| 2,014,561 | Dysart | Sept. 17, 1935 |
| 2,152,320 | Llorens | Mar. 28, 1939 |
| 2,368,311 | Llorens | Jan. 30, 1945 |